US007450148B2

(12) United States Patent
Kim et al.

(10) Patent No.: US 7,450,148 B2
(45) Date of Patent: Nov. 11, 2008

(54) A/V SYSTEM AVAILABLE FOR INTEGRATED CONTROL AND METHOD OF CONTROLLING THE SAME

(75) Inventors: Jae-kwon Kim, Suwon-si (KR); Yong-jun Kim, Yongin-si (KR); Hyo-dae Kim, Suwon-si (KR); Yu-seong Jeon, Suwon-si (KR); Jong-wook Park, Seoul (KR); Eu-gene Choi, Seoul (KR); Sung-hee Kim, Seoul (KR); Young-mi Kang, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 901 days.

(21) Appl. No.: 10/913,801

(22) Filed: Aug. 9, 2004

(65) Prior Publication Data

US 2005/0102699 A1 May 12, 2005

Related U.S. Application Data

(60) Provisional application No. 60/492,973, filed on Aug. 7, 2003.

(30) Foreign Application Priority Data

| | | |
|---|---|---|
| Aug. 7, 2003 | (KR) | 10-2003-0054791 |
| Aug. 9, 2003 | (KR) | 10-2003-0055230 |
| Aug. 21, 2003 | (KR) | 10-2003-0057899 |
| Apr. 9, 2004 | (KR) | 10-2004-0024560 |

(51) Int. Cl.
*H04N 7/14* (2006.01)
*H04M 11/00* (2006.01)

(52) U.S. Cl. ............... 348/14.01; 348/14.02; 348/14.04

(58) Field of Classification Search ... 348/14.01–14.09, 348/14.1, 14.12–14.16; 379/102.01–102.07; 340/825.72, 825.22, 825.24; 709/227, 224, 709/225, 219

See application file for complete search history.

(56) References Cited

U.S. PATENT DOCUMENTS 5,909,183 A 6/1999 Borgstahl et al.

(Continued)

FOREIGN PATENT DOCUMENTS

EP 0 807 880 A1 11/1997

(Continued)

*Primary Examiner*—Melur Ramakrishnaiah
(74) *Attorney, Agent, or Firm*—Sughrue Mion, PLLC

(57) ABSTRACT

A method for controlling a plurality of devices including a master device having AV terminals and slave devices connected to the master device through a communication control line, with the use of a single remote control. The method includes detecting the slave devices, and allocating a device ID to each of the slave devices, identifying to which slave device each AV terminal is connected, by controlling the detected slave devices to be powered on or off through the communication control line with the use of the device ID, receiving a predetermined key code from a user's remote control, and determining which device among the master device and the slave devices to control and determining an operation of the device, by referring to an item of mapping table corresponding to the key code, and controlling operation of the device through the communication control line with the use of the device ID.

7 Claims, 37 Drawing Sheets

U.S. PATENT DOCUMENTS

| | | | | |
|---|---|---|---|---|
| 6,469,751 | B1 | 10/2002 | Isobe et al. | |
| 2002/0044199 | A1 | 4/2002 | Barzebar et al. | |
| 2002/0089427 | A1 * | 7/2002 | Aratani et al. | 340/825.72 |
| 2004/0047298 | A1 * | 3/2004 | Yook et al. | 370/254 |

FOREIGN PATENT DOCUMENTS

| | | | |
|---|---|---|---|
| JP | 3-273797 | A | 12/1991 |
| JP | 6-261372 | A | 9/1994 |
| JP | 8-18813 | A | 1/1996 |
| JP | 8-149576 | A | 6/1996 |
| JP | 11-355685 | A | 12/1999 |
| JP | 2003-319478 | A | 11/2003 |
| KR | 1997-0025012 | A | 5/1997 |
| KR | 1997-0048116 | U | 7/1997 |
| KR | 1998-078490 | A | 11/1998 |
| KR | 1999-0073086 | A | 10/1999 |
| KR | 2000-0021434 | A | 4/2000 |
| KR | 2000-0033887 | A | 6/2000 |
| KR | 2001-0054612 | A | 7/2001 |
| KR | 2001-0064657 | A | 7/2001 |
| KR | 2002-0017730 | A | 3/2002 |
| KR | 2002-0028470 | A | 4/2002 |
| KR | 2002-0050490 | A | 6/2002 |
| KR | 2003-0042528 | A | 6/2003 |
| WO | WO 02/098122 | A1 | 12/2002 |

* cited by examiner

FIG. 3E

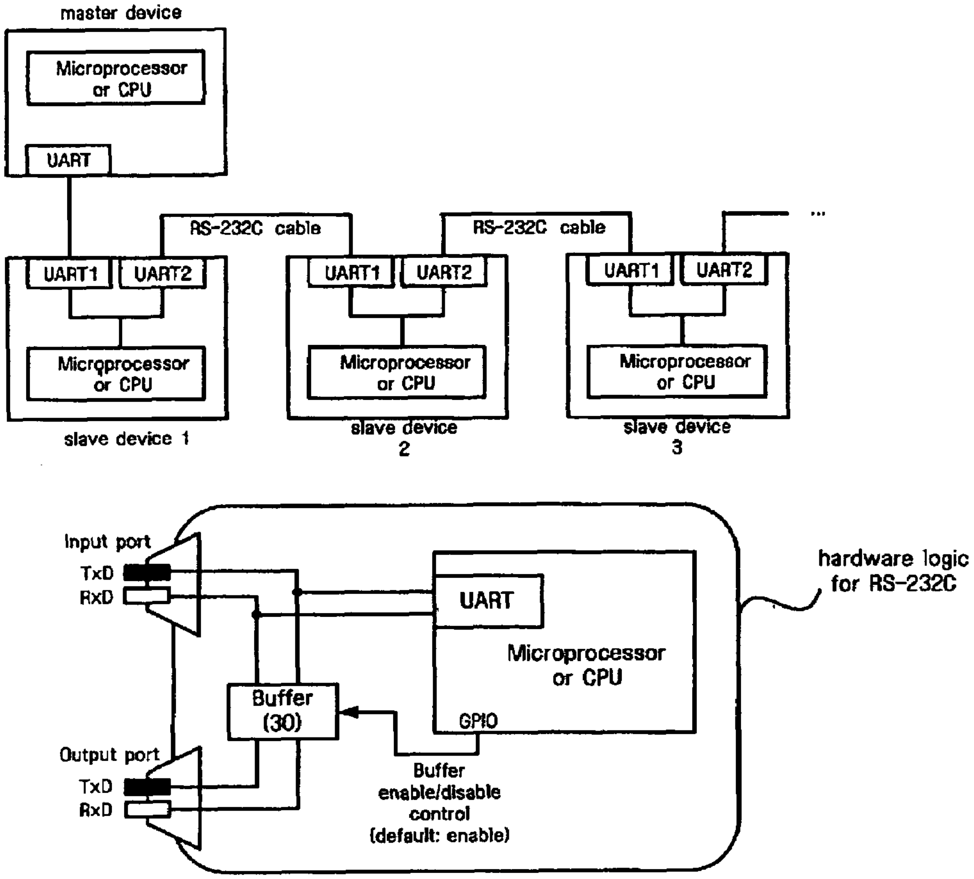

```
DescoveryAddressDevice()
{
  MessageFromDevice=TRUE;
  Broadcast to all device to disable the control buffer and clear all device ID
  While(MessageFromDevice==FALSE)do
  {
     Send WhoAreYou Packet to device        (A)
     if(Receive WhoIAm Packet)              (B)
     {
          Generate new device ID and send it to device
          Register the device ID
          (The device will enable the buffer)
     }
     else
     {
          MessageFromDevice=FALSE
     }
  }
}
```

```
UpdateDeviceStatus()
{
  for(id=id_start id < id_end; id++)
  {
        //query device status and store the return value
        //IF there is no return value, DeviceStatus is NULL
        DeviceStatus = QueryDeviceStatus(id);
        //Update the device status information
        Device[id].Status = DeviceStatus;
  }
}
```

FIG. 6C

```
UpdateDeviceStatus()
{
  for(id=id_start id < id_end; id++)
  {
        //query device status and store the return value
        DeviceStatus = QueryDeviceStatus(id);
        //IF there is no return value, DeviceStatus is NULL
        If(DeviceStatus == NULL)
        {
              remove the device ID
        }
        else
        {
              //update the device status information
              Device[id].Status = DeviceStatus;
        }
  }
}
```

FIG. 10

| If Back panel image is available | If Back panel image is not available |
|---|---|
| Whether back panel image exists or not : yes | Whether back panel image exists or not : no |
| Back panel image | Number of the component input/output terminal |
| Back panel image information (type, color, width, height) | Type of component input/output terminal (DTV/DVD/…) |
| Number of the component input/output terminal | Number of the external input/output terminal |
| Type of component input/output terminal (DTV/DVD/…) | Type of the external input/output terminal (Monitor/VCR/…) |
| Central coordinates on image in each of component input/output terminal (Y/Pb/Pr, L/R) | Number of S-video input/output terminal |
| Number of the external input/output terminal | Type of S-video input/output terminal (DVD/VCR/..) |
| Type of the external input/output terminal (monitor/VCR/…) | Number of antenna input/output terminal |
| Central coordinates on image in each of external input/output terminal (R/G/B, L/R) | Type of antenna input/output terminal (coaxial/…) |
| Number of S-video input/output terminal | Number of digital audio input/output terminal |
| Type of S-video input/output terminal (DVD/VCR/…) | Type of digital audio input/output terminal (DVD/SAT/…) |
| Central coordinates on image in each of S-video input/output terminal | Number of external amplifier output terminal |
| External input/output terminal number of audio connected to S-video input/output terminal | Type of external amplifier output terminal (FL/FR/…) |
| Number of antenna input/output terminal | Number of subwoofer output terminal |
| Type of antenna input/output terminal (coaxial/…) | … |
| Central coordinates on image in each of antenna input/output terminal | |
| Number of digital audio input/output terminal | |
| Type of digital audio input/output terminal (DVD/SAT/…) | |
| Central coordinates on image in each of digital audio input/output terminal | |
| Number of external amplifier output terminal | |
| Type of external amplifier output terminal (FL/FR/…) | |
| Central coordinates on image in each of external amplifier output terminal(L/R) | |
| Number of subwoofer output terminal | |
| Central coordinates on image in each of subwoofer output terminal | |
| … | |

FIG. 13C

| | |
|---|---|
| Header | 0 xABBA (discriminator) |
| Src. ID | master device |
| Dest. ID | slave device |
| Msg. Type | Signal input inquiry |
| Body Len. | Body size |
| Body | First component input terminal |
| Checksum | check sum |

Request packet

→

| | |
|---|---|
| Header | 0 xABBA (discriminator) |
| Src. ID | slave device |
| Dest. ID | master device |
| Msg. Type | Signal input response |
| Body Len. | Body size |
| Body | On or Off |
| Checksum | check sum |

Response packet

FIG. 13D

| | |
|---|---|
| Header | 0 xABBA (discriminator) |
| Src. ID | master device |
| Dest. ID | slave device |
| Msg. Type | device control command |
| Body Len. | Body size |
| Body | power On or Off |
| Checksum | check sum |

Request packet

| | |
|---|---|
| Header | 0 xABBA (discriminator) |
| Src. ID | slave device |
| Dest. ID | master device |
| Msg. Type | device control response |
| Body Len. | Body size |
| Body | success or failure |
| Checksum | check sum |

Response packet

```
PlugDetection()
{
  For all slaves S
  {
        send MSG_GET_PULG_TYPE ot S
        Receive response message from S
  }

  For all source or combo devices S
  {
        For all source or combo devices T except S
        {
              Send MSG_SIG_OFF to T;
        }

        Send MSG_SIG_ON to S;
        For all sink or combo devices U except S
        {
              Send MSG_DETECT_SIG_INPUT to U;
              Received response message from U
        }
  }
}
```

FIG. 19A

| Key code | Control command according to device state | Device to be controlled |
|---|---|---|
| Power supply | POWER | Combo retransmission |
| When key is inputted continuously | COMBOR_POWER, AVR_POWER, STBR_POWER, POWER | 1. Combo AVR STB retransmission 2. TV UI |
| DTV+ | Not supported in this mode | Return |
| Preference channel | Not supported in this mode | Return |
| Device selection | Not supported in this mode | Return |
| Number (when TV OSD is OFF) | COMBOR_NUM_NUM0 | Combo retransmission |
| | COMBOR_NUM_NUM1 | Combo retransmission |
| | COMBOR_NUM_NUM2 | Combo retransmission |
| | COMBOR_NUM_NUM3 | Combo retransmission |
| | COMBOR_NUM_NUM4 | Combo retransmission |
| | COMBOR_NUM_NUM5 | Combo retransmission |
| | COMBOR_NUM_NUM6 | Combo retransmission |
| | COMBOR_NUM_NUM7 | Combo retransmission |
| | COMBOR_NUM_NUM8 | Combo retransmission |
| | COMBOR_NUM_NUM9 | Combo retransmission |
| Number (when TV OSD is ON) | NUM0 | TV UI |
| | NUM1 | TV UI |
| | NUM2 | TV UI |
| | NUM3 | TV UI |
| | NUM4 | TV UI |
| | NUM5 | TV UI |
| | NUM6 | TV UI |
| | NUM7 | TV UI |
| | NUM8 | TV UI |
| | NUM9 | TV UI |
| Mute | MUTE | TV UI |
| | AVRCR_AUDIO_MUTE | AVR retransmission |
| Volume (same as when continous key is inputted) | VOL_UP(when listening with TV set) | TV UI |
| | VOL_UP(when listening with TV set) | TV UI |
| | AVRCR_VOLUME_UP | AVR retransmission |
| | AVRCR_VOLUME_DOWN | AVR retransmission |
| When channel TV OSD is OFF | COMBOR_CHANNEL_UP | Combo retransmission |
| | COMBOR_CHANNEL_DOWN | Combo retransmission |
| When channel TV OSD is ON | CH_UP | TV UI |
| | CH_DOWN | TV UI |
| TV / external input | TV_VIDEO | TV UI |
| Menu | COMBOR_DISC_MENU | Combo retransmission |
| Broadcating information | Not supported in this mode | Return |
| Information display | COMBOR_INFO_DISPLAY | Combo retransmission |
| End | COMBOR_RETURN | Combo retransmission |
| End (when OSD menu is ON) | EXIT | TV UI |
| Four directions / selection (same as when continous key is inputted) | COMBOR_CURSOR_UP | Combo retransmission |
| | COMBOR_CURSOR_DOWN | Combo retransmission |
| | COMBOR_CURSOR_RIGHT | Combo retransmission |
| | COMBOR_CURSOR_LEFT | Combo retransmission |
| | COMBOR_ENTER | Combo retransmission |
| Four directions / selection (When TV OSD menu is ON) | CURSOR_UP | TV UI |
| | CURSOR_DOWN | TV UI |
| | CURSOR_RIGHT | TV UI |
| | CURSOR_LEFT | TV UI |
| | ENTER | TV UI |
| Screen mode | PSM | TV UI |
| Still screen | STILL_PIC | TV UI |
| Screen size | ARC | TV UI |
| Surround | DOLBY | TV UI |
| Automatic channel | Not supported in this mode | Return |
| Memory / delete | Not supported in this mode | Return |
| Multi-sound | Not supported in this mode | Return |
| Replay function | COMBOR_BACK_REW | Combo retransmission |
| | COMBOR_STOP | Combo retransmission |
| | COMBOR_PLAY_PAUSE | Combo retransmission |
| | COMBOR_FOR_FF | Combo retransmission |

FIG. 19B

| Key code | Control command according to device state | Device to be controlled |
|---|---|---|
| Power supply | POWER | STB retransmission |
| When key is inputted continously | COMBOR_POWER, AVR_POWER, STBR_POWER, POWER | 1. Combo AVR STB retransmission 2. TV UI |
| Preference channel | Not supported in this mode | Return |
| Device selection | Not supported in this mode | Return |
| Number | STBR_NUM_0 | STB retransmission |
| | STBR_NUM_1 | STB retransmission |
| | STBR_NUM_2 | STB retransmission |
| | STBR_NUM_3 | STB retransmission |
| | STBR_NUM_4 | STB retransmission |
| | STBR_NUM_5 | STB retransmission |
| | STBR_NUM_6 | STB retransmission |
| | STBR_NUM_7 | STB retransmission |
| | STBR_NUM_8 | STB retransmission |
| | STBR_NUM_9 | STB retransmission |
| Mute | MUTE | TV UI |
| | AVRCR_AUDIO_MUTE | AVR retransmission |
| Volume (same as when continous key is inputted) | VOL_UP (when listening with TV set) | TV UI |
| | VOL_UP (when listening with TV set) | TV UI |
| | AVRCR_VOLUME_UP | AVR retransmission |
| | AVRCR_VOLUME_DOWN | AVR retransmission |
| channel | STBR_CHANNEL_UP | STB retransmission |
| | STBR_CHANNEL_DOWN | STB retransmission |
| TV / external input | Not supported in this mode | Return |
| Menu | STBR_MENU | STB retransmission |
| Broadcating information | Not supported in this mode | Return |
| Information display | STBR_INFO_DISPLAY | STB retransmission |
| End | Not supported in this mode | Return |
| End (when OSD menu is ON) | EXIT | TV UI |
| Four directions / selection (same as when continous key is inputted) | STBR_CURSOR_UP | STB retransmission |
| | STBR_CURSOR_DOWN | STB retransmission |
| | STBR_CURSOR_RIGHT | STB retransmission |
| | STBR_CURSOR_LEFT | STB retransmission |
| | STBR_ENTER | STB retransmission |
| Four directions / selection (When TV OSD menu is ON) | CURSOR_UP | TV UI |
| | CURSOR_DOWN | TV UI |
| | CURSOR_RIGHT | TV UI |
| | CURSOR_LEFT | TV UI |
| | ENTER | TV UI |
| Screen mode | PSM (when OSD menu is ON) | TV UI |
| Still screen | STILL_PIC (when OSD menu is ON) | TV UI |
| Screen size | ARC (when OSD menu is ON) | TV UI |
| Surround | DOLBY (when OSD menu is ON) | TV UI |
| Automatic channel | Not supported in this mode | Return |
| Memory / delete | Not supported in this mode | Return |
| Multi-sound | Not supported in this mode | Return |
| Replay function | Not supported in this mode | Return |
| | Not supported in this mode | Return |
| | Not supported in this mode | Return |
| | Not supported in this mode | Return |

A/V SYSTEM AVAILABLE FOR INTEGRATED CONTROL AND METHOD OF CONTROLLING THE SAME

CROSS-REFERENCE TO RELATED APPLICATION

This application claims priorities from Korean Patent Application Nos. 10-2003-0054791, 10-2003-0055230, 10-2003-0057899 and 10-2004-0024560, filed Aug. 7, 9 and 21, 2003 and Apr. 9, 2004, respectively, and U.S. Provisional Patent Application No. 60/492,973 filed on Aug. 7, 2003, the whole disclosures of which are hereby incorporated herein by reference.

BACKGROUND OF THE INVENTION

1. Field of the Invention

The present invention relates to an Audio/Visual ("A/V") system available for integrated control and a method for controlling the same and, more particularly, to an A/V system available for integrated control and a method for controlling the same. Each of slave devices existing on a network is allocated a device ID to differentiate it from any other device existing on the network in order to identify a connection state between the slave device and a master device. Accordingly, a plurality of slave devices existing on the network can be controlled in a integrated manner.

2. Description of the Related Art

Generally two kinds of remote controls have been in use: a dedicated remote control and a universal remote control. The dedicated remote control is provided for respective devices and models. The use of the dedicated remote control is appropriate only for a device originally intended whereas the universal remote control is designed to control a plurality of devices. The universal remote control includes device selection buttons and manufacturer selection buttons. Devices to be controlled by the universal control (hereinafter referred to as "slave devices") are inherently configured in the remote control.

FIG. 1 is a view showing dedicated remote controls and controlled devices in the art, wherein the dedicated remote controls should be provided for devices to be controlled.

Accordingly, a user has to manipulate a plurality of devices (for example, DTVs (digital TVs), DVDs (digital versatile disks), STBs (set-top boxes), VCRs (video cassette recorders), A/V-Receivers, and so forth) respectively using separate remote controls, and for this reason, the user is requested to manage several remote controls and learn how to use the remote controls.

FIG. 2 is a view showing a universal remote control and controlled devices in the art, wherein devices to be controlled are inherently configured in the universal remote control and a user can control respective devices by changing modes of the remote control, thereby making it inconvenient to use the controlled devices.

By doing so, the user experiences inconvenience since he or she has to change the remote control's mode in order to use the remote control to control the corresponding device.

Also, since the universal remote control cannot control newly added to-be-controlled devices except devices configured inherently for the control, a separate remote control has to be provided when a user purchases a new device.

SUMMARY OF THE INVENTION

An object of the present invention is to provide an A/V system available for integrated control and a method for controlling the same, wherein slave devices existing on a network are granted device IDs in order to obtain their device information.

Another object of the present invention is to provide an integrally controllable A/V system and its control method wherein an optimal connection state is configured by recognizing a state of a connection between master device and slave device.

A further object of the present invention is to provide an integrally controllable A/V system and its control method wherein a plurality of slave device existing on a network can be integrally controlled.

According to an exemplary embodiment of the present invention, there is provided a method for controlling a plurality of devices including a master device having AV terminals and slave devices connected to the master device through a communication control line, with the use of a single remote control, including detecting the slave devices, and allocating a device ID to each of the respective detected slave devices, identifying to which slave device of the detected slave devices each AV terminal is connected, by controlling the detected slave devices to be powered on or off through the communication control line with the use of the device IDs, receiving a predetermined key code from a user's remote control, and determining which device among the master device and the slave devices to control and determining an operation of the determined device, by referring to an item of a mapping table corresponding to the key code, and controlling the operation of the determined device through the communication control line with the use of the device ID of the determined device.

According to another exemplary embodiment of the present invention, there is provided a master device for identifying a slave device connected thereto through a communication control line, comprising a control signal transceiver transmitting a packet including various control commands to the slave device and receiving response packets to the control commands, a control signal generating unit generating the control command in the form of a digital signal in compliance with a predetermined protocol, and a device ID generating unit allocating a device ID to the slave device.

According to a further exemplary embodiment of the present invention, there is provided a slave device connected to a master device through a communication control line, which is identified by the master device, comprising a control signal transceiver receiving a packet including various control commands from the master device and transmitting response packets to the control commands, a communication control line through which the master device and the slave device are connected and through which the packets move, and a memory storing therein the device ID received from the master device.

According to a still further exemplary embodiment of the present invention, there is provided a television set (TV) comprising a key input unit receiving a key input by a user, an ID generating unit allocating a device ID to a slave device detected to be connected to a master device through a communication control line, a control signal transceiver transmitting a digital signal containing control commands to the slave device with the use of the device ID allocated according to the key input by the user and receiving a digital signal containing responses to the control commands, a control signal generating unit generating a digital signal containing the control commands according to a predetermined protocol, and an AV signal transceiver transmitting the slave device an analog signal for a video or a sound and receiving the signal through an AV cable according to the control commands.

BRIEF DESCRIPTION OF THE DRAWINGS

The above and other features and advantages of the present invention will become more apparent to those of ordinary skill in the art by describing in detail the preferred embodiments thereof with reference to the attached drawings in which:

FIG. 3E is a block diagram showing a case in which a master device and slave devices are connected in a daisy-chain method using an RS-232C cable;

FIG. 6C is a view showing checking whether to delete a slave device on a network, with respect to automatic allocation of an ID to the slave device;

FIG. 10 is a view explaining an example of back panel information;

FIG. 13A-13D are views illustrating an internal construction of a packet transmitting and receiving information between master device and slave devices;

FIG. 19A and FIG. 19B show a mapping table in accordance with the present invention;

DETAILED DESCRIPTION OF THE INVENTION

The present invention will be described more fully hereinafter with reference to the accompanying drawings, in which exemplary embodiments of the invention are illustrated. This invention may, however, be embodied in different forms and should not be construed as limited to the embodiments set fourth herein.

Figure 1:
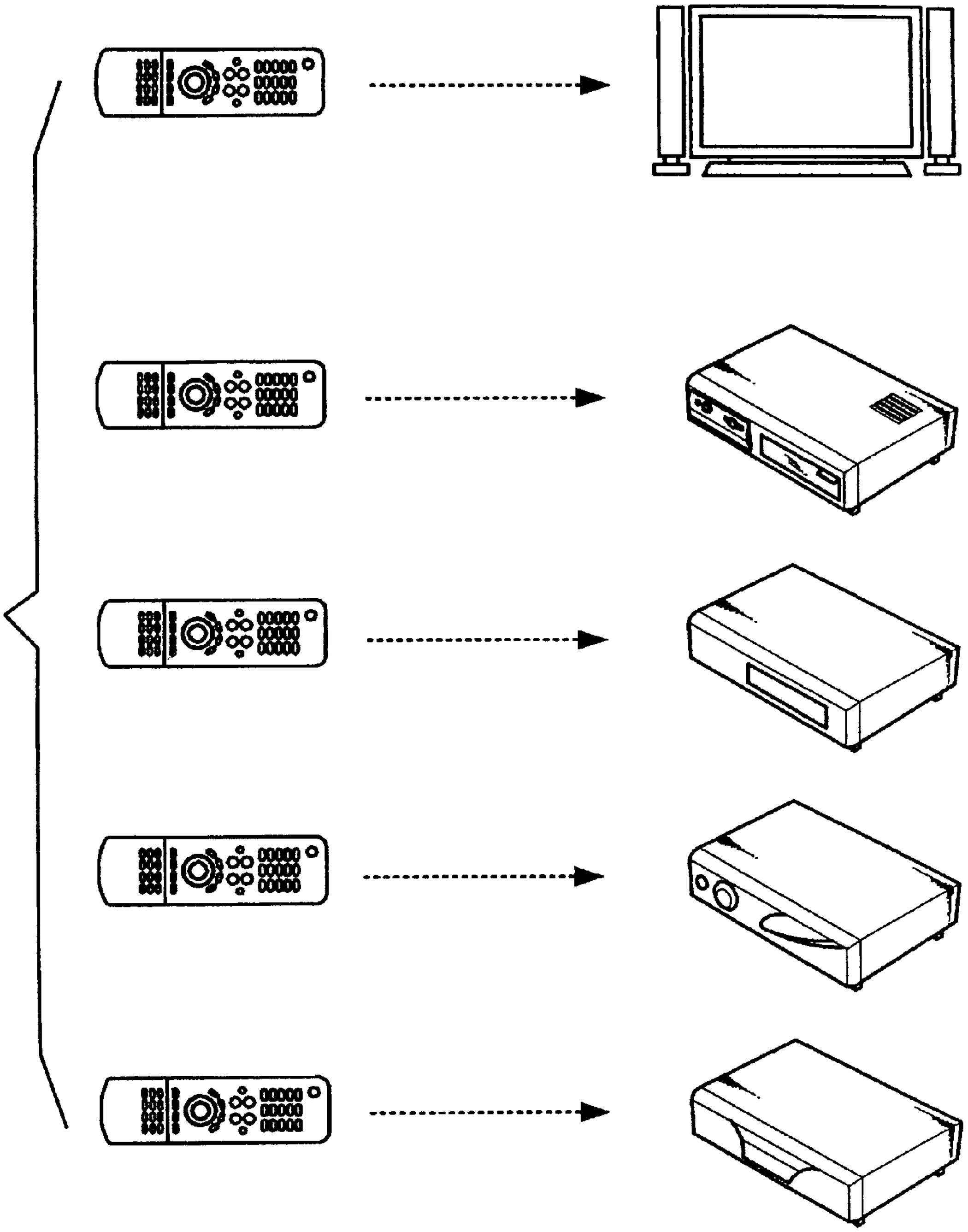
FIG. 1 is a view showing dedicated remote controls and controlled devices in the art.
Figure 2:
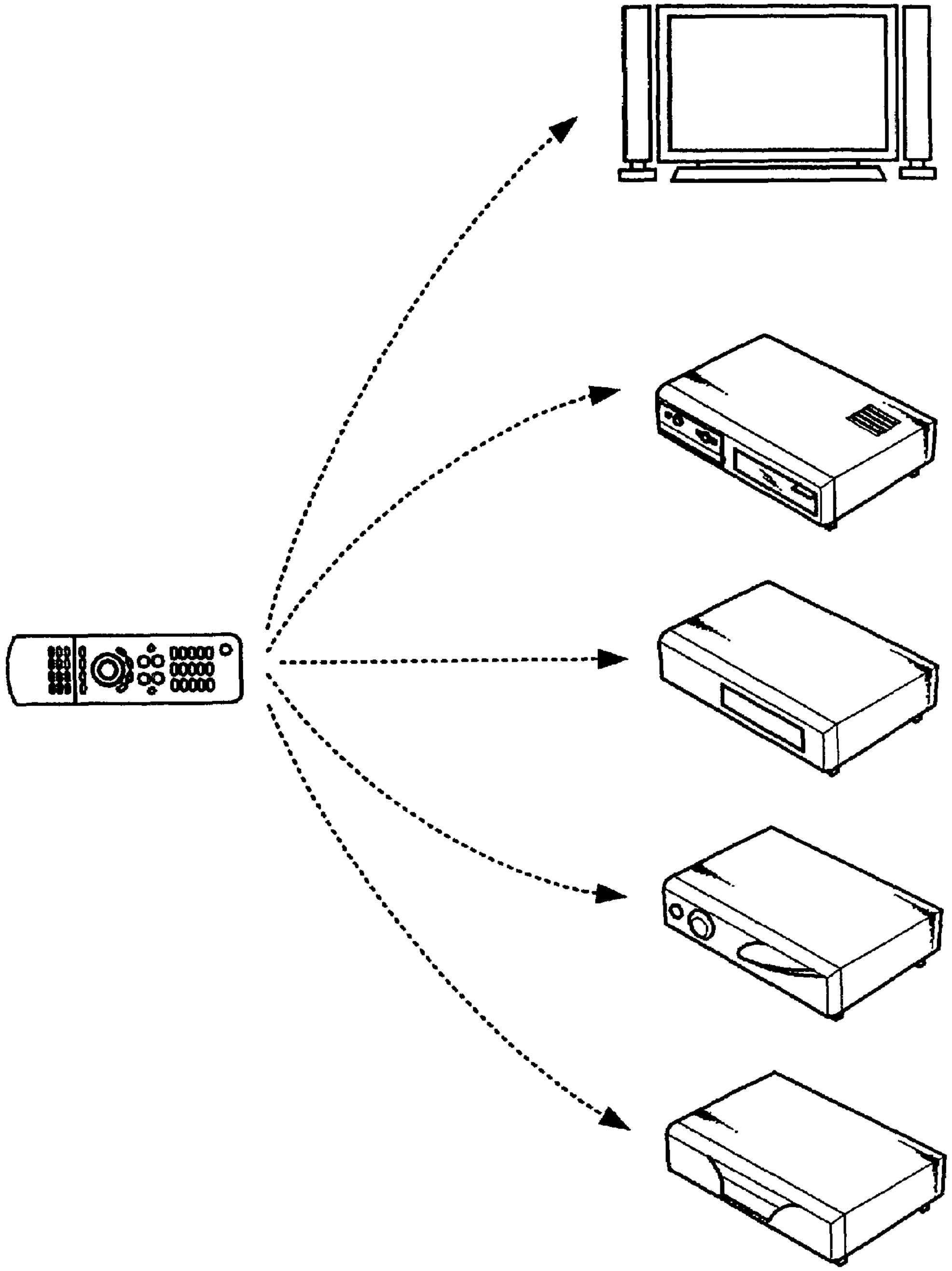
FIG. 2 is a view showing a universal remote control and controlled devices in the art.
Figure 3A:
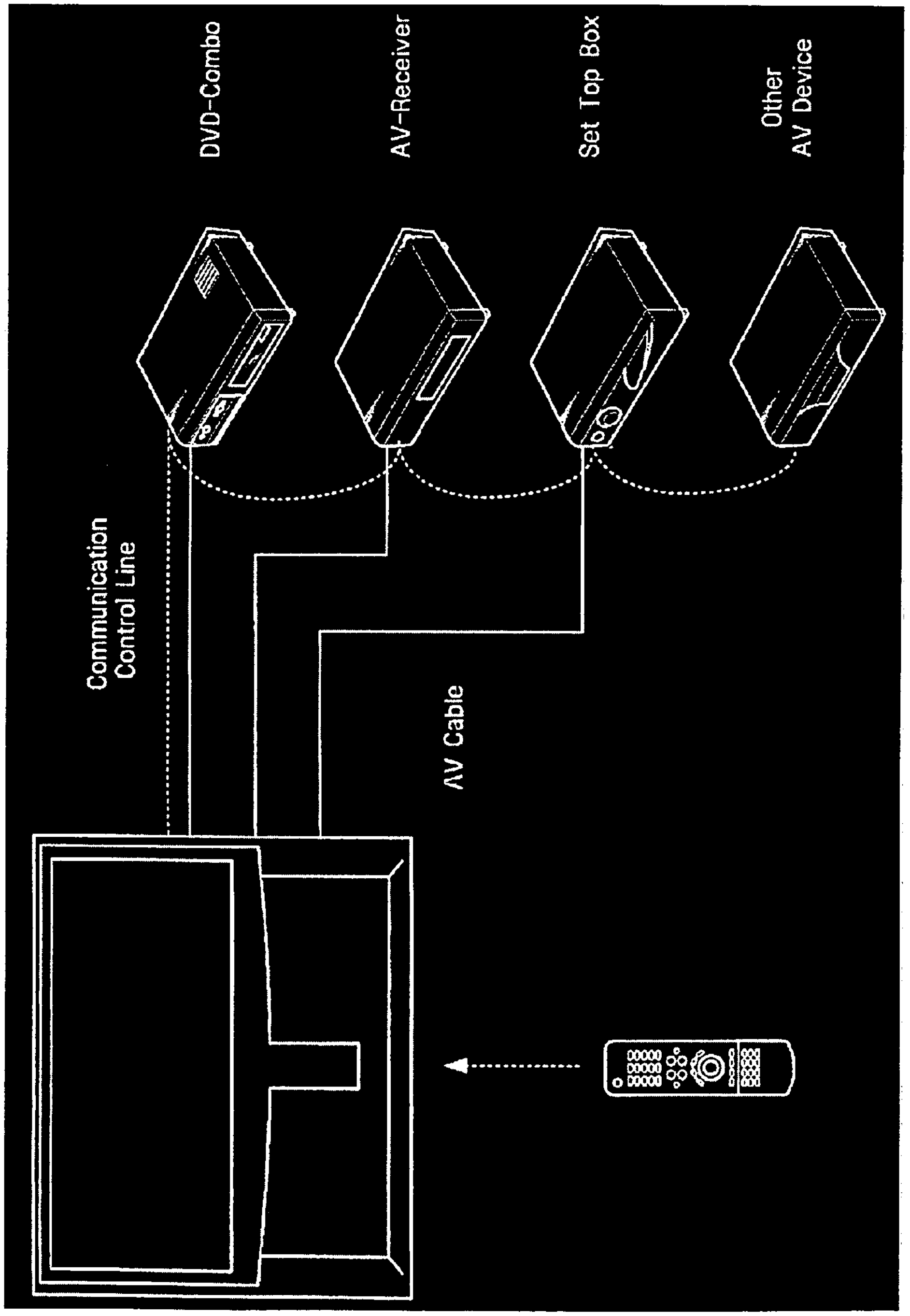
FIG. 3A is a view showing how to control slave devices through a universal remote control in accordance with the present invention.

The present invention, as shown in FIG. 3A, comprises AV cables (indicated by solid lines) transmitting and receiving video or audio signals as well as communication control lines (indicated by dotted lines) using a separate protocol to transmit data packets, for example, IEEE 1394 connection lines, RS-232C cables, or the like. Over the control lines, device information, connection status information and the like of the AV devices may be transmitted and received and operation commands that can control the devices may be delivered.

Figure 3B:
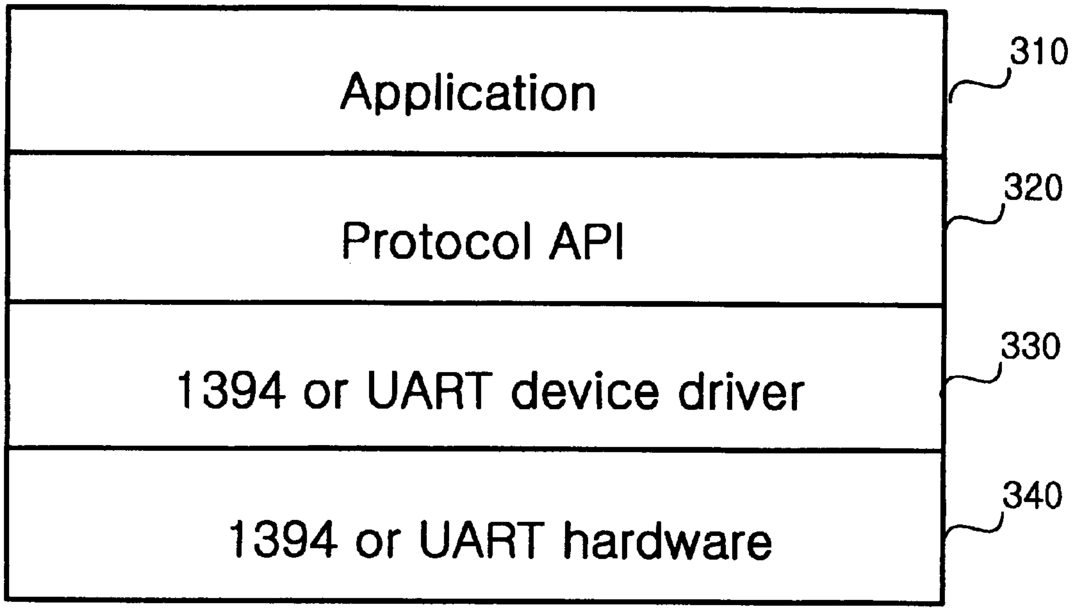
FIG. 3B is a view showing a hierarchy structure of software and hardware with which IEEE 1394 and RS-232C methods can be embodied.

FIG. 3B illustrates a layer structure of software and hardware for implementing the aforementioned IEEE 1394 and RS-232C schemes. First, an uppermost application 310 is present, which is an application program, and then a protocol application program interface (API) 320, which is a middleware serving as a protocol being a communication language between devices, is present between the application 310 and a device driver 330. Beneath the protocol API, a device driver 330 is present to drive devices such as 1394, a universal asynchronous receiver/transmitter (UART) or the like. At a bottom position, a physical layer 340, namely, an 1394 port or UART hardware is present. It will be readily apparent to those skilled in the art that the present invention may be implemented by using a variety of physical layers such as a scheme using Ethernet, a scheme using power line communication (PLC), or the like, in addition to the aforementioned IEEE 1394 and RS-232C schemes.

Figure 3C:
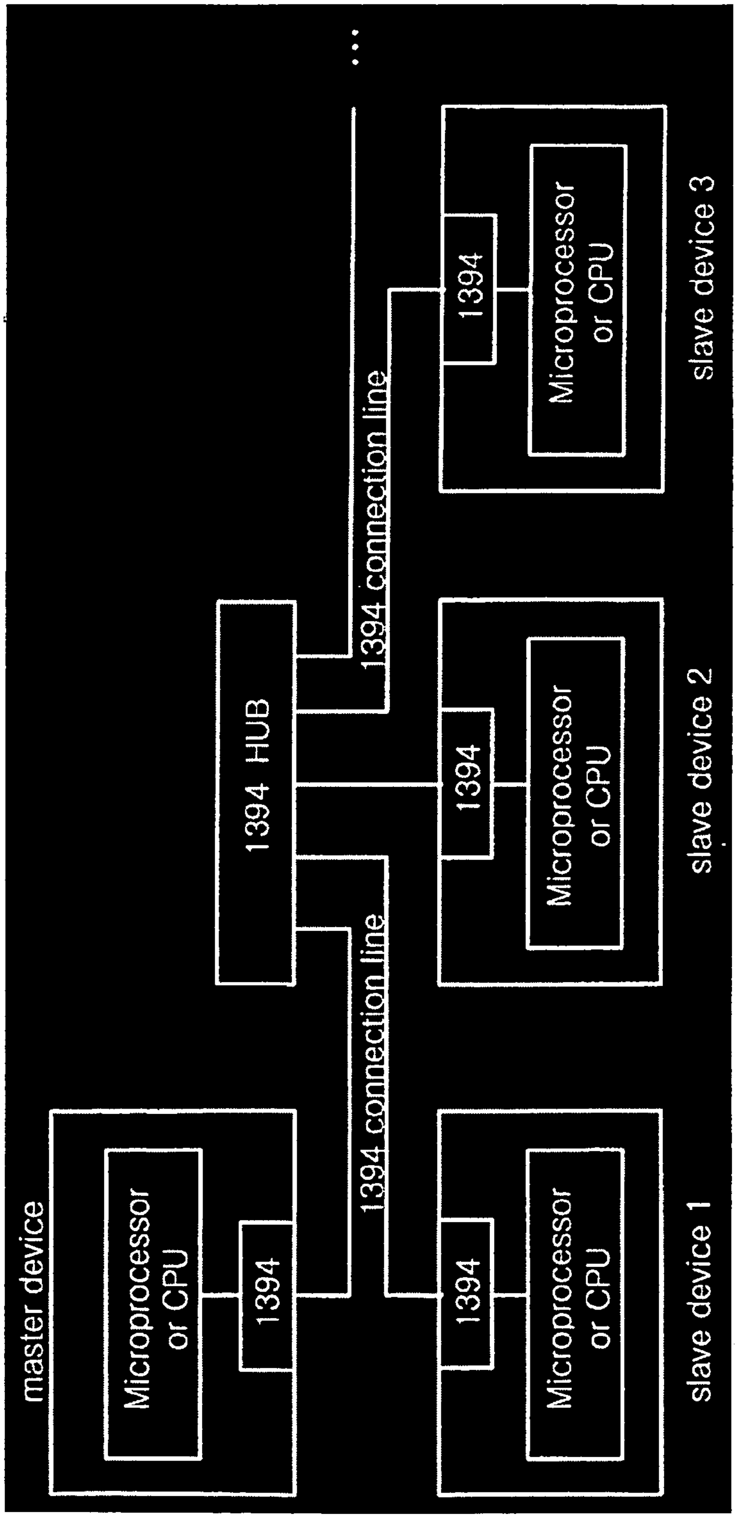
FIG. 3C is a view showing a case in which a master device and slave devices are connected through a 1394 connection line using a hub.
Figure 3D:
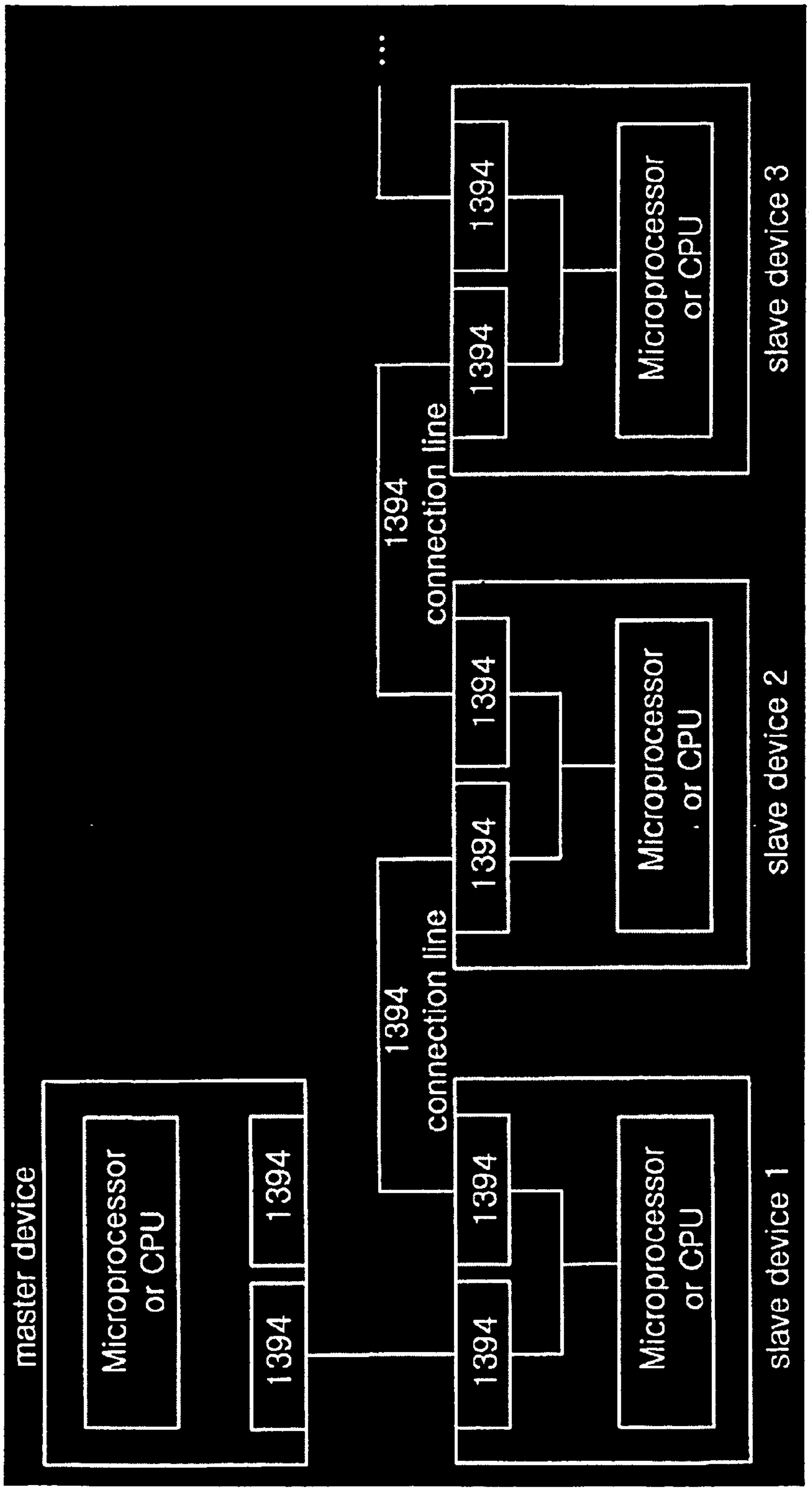
FIG. 3D is a block diagram showing a case in which a master device and slave devices are connected in a daisy-chain method.

FIG. 3C is a block diagram illustrating a TV (master device) and AV devices (slave devices) connected to one another through 1394 connection lines using a hub, and FIG. 3D is a block diagram illustrating a TV and AV devices connected to one another in a daisy-chain scheme that does not use a hub. In FIG. 3C, the TV and other devices are all connected to the 1394 hub over 1394 connection lines. In this case, each device has a unique device ID, namely, a global unique ID (GUID) through a mechanism conforming to the IEEE 1394 standard, but the given ID is reset and configured back when a device is added or deleted. The microcomputers as shown are central processing modules embedded in home electronics devices or the like and perform the same role as a CPU. There may be a scheme for using connection lines of the IEEE 1394 scheme while connecting between the TV and the respective AV devices in the daisy-chain scheme without using the hub, as shown in FIG. 3D. This scheme is a scheme in which a 1394 port of the TV is connected to a first 1394 port of a first device, and a second 1394 port of the first device is connected to a first 1394 port of a second device.

FIG. 3E is a block diagram illustrating a TV and AV devices connected to one another in a daisy-chain scheme, using RS-232C (Recommended Standard 232 Revision C) cables. This scheme is a scheme in which a universal asynchronous receiver/transmitter (UART) of the TV is connected to a UART 1 of a first device, the UART 1 of the first device is in turn connected to a UART2 of the first device, and the UART2 of the first device is in turn connected to a UART1 of a second device. As such, the communication control line using the RS-232C cable is a serial connection scheme in which the TV and the first device are connected to each other using the UART ports and, likewise, the first device and the second device are connected to each other using the UART port. In addition, a buffer 30 is connected between the UART2 port of the first device and the UART1 of the second device and the buffer 30 is disabled or enabled according to control commands from the TV as a master device. If the allocation of IDs to a number of slave devices is desired, the TV as a master device transmits a control command to a number of slave devices in order to disable the buffers of the slave devices, and disable the devices other than the first device. Thus, the TV gives an ID for communication with the first device, and transmits a control command to enable the buffer between the first device and the second device. If the buffer is enabled according to the control command from the TV, the TV allocates an ID for communication with the second device. If a GUID is given to an AV device using a RS-232C cable as described above, the given ID need not be reset even when a device is added or deleted. The process of allocating the ID will be described in detail upon discussing on FIGS. 6B, and 6C.

Figure 4:
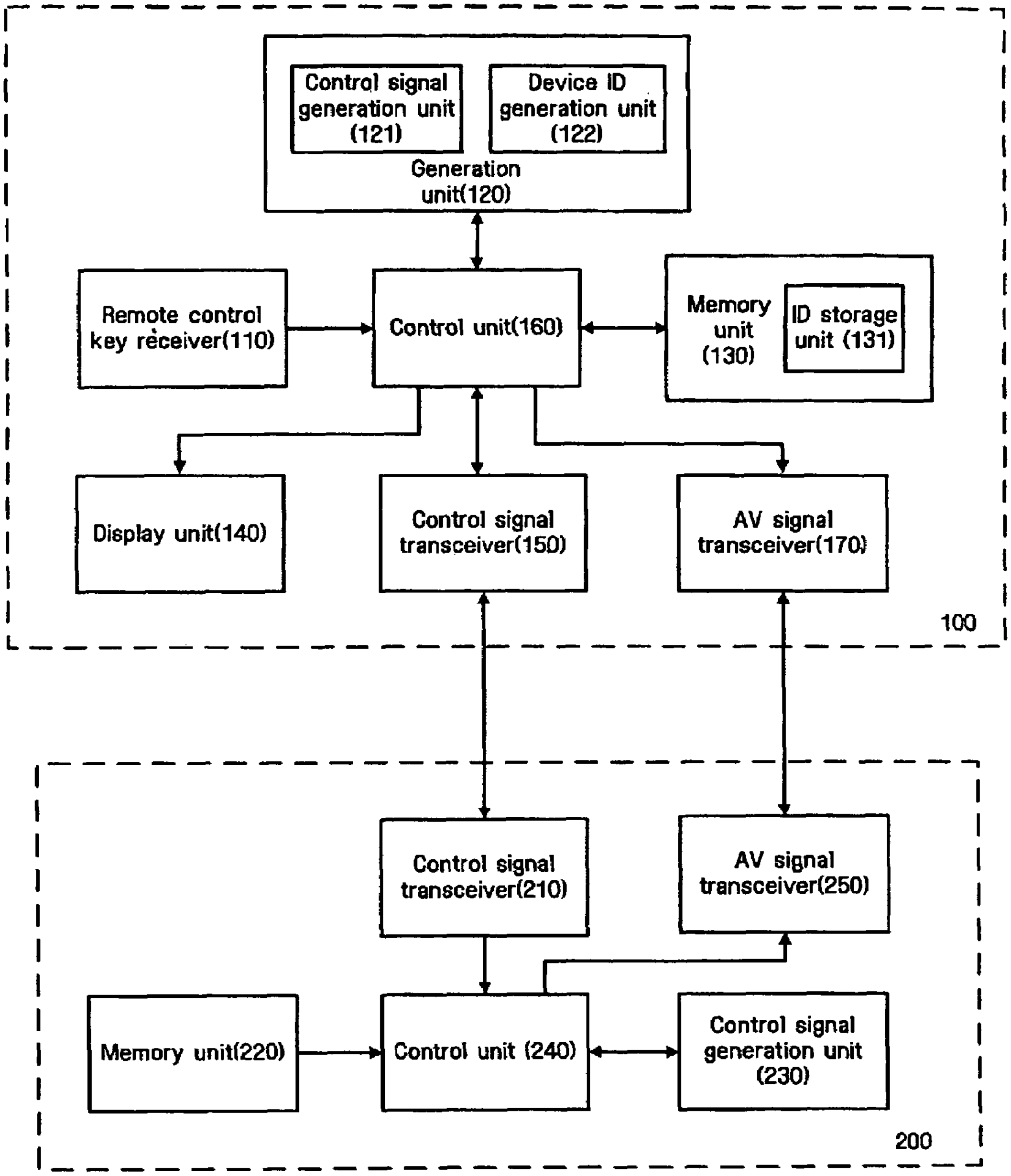
FIG. 4 is a block diagram showing an A/V system available for integrated control in accordance with the present invention, comprising a master device part and a slave device part.

FIG. 4 is a block diagram showing an A/V system for integrated control in accordance with the present invention, comprising a master device part 100 and a slave device part 200, wherein the master device part includes a remote control key receiving unit 110, a generation unit 120, a memory unit 130, a display unit 140, a control signal transceiver 150, a control unit 160, and a AV signal transceiver. The slave device part includes a control signal transceiver 210, a memory unit 220, a control signal generation unit 230 and a control unit 240.

The remote control key receiving unit 110 receives a key code value input by a user.

The generation unit 120 generates a control command packet and a device identification ID, which comprises a control signal generation unit 121 which generates a packet including a control command, a packet requesting back panel information from the slave device, and a packet controlling ON/OFF of the slave device, etc. and an device ID generation unit 122 which generates an ID to be allocated to the slave device along with the device identification ID.

The memory unit 130 stores connection state information indicating a state of a connection with the slave device 200. Also, the memory unit 130 further comprises an ID storage unit 131 storing the device identification ID which the slave device 200 is allocated.

The display unit 140 generates a graphic for a connection state between devices using the back panel information received from the slave device 200 and shows a user the graphic.

The control signal transceiver 150 transmits a packet including a variety of control commands to the slave device 200 and receives a packet responding to the control command.

The control unit 160 checks a connection signal through an A/V cable connected to the slave device 200, calculates configuration for an optimal connection by collecting the back panel information of the slave device 200, and determines whether the current connection state is optimal. An AV signal transceiver 170 transmits analog signals for video or sound to an AV signal transceiver 250 of the slave device 200, and receives the signals from the slave device through an AV cable according to a control command generated in the control signal generation unit 121. For example, the signals inputted from the AV signal transceiver 170 comprises a YPbPr video signal inputted from a component terminal, a S-video signal inputted from an S-video terminal, a sound signal inputted from a digital audio terminal, or a sound signal inputted from an analog audio terminal whereas the signals outputted from the AV signal transceiver 170 comprises an video signal outputted from a TV or a sound signal outputted from a TV.

The control signal transceiver 210 receives a packet including a variety of control commands from the master device 100, transmits a packet responding to the control command, and then receives a packet requesting the back panel information generated from the master device 100 and a packet controlling ON/OFF of the slave device.

The memory unit 220 stores the back panel information and the device identification ID received from the master device 100.

The control signal generation unit 230 receives a packet transmitted from the master device 100 and generates a packet corresponding to the transmitted packet.

The control unit 240 checks the connection signal through the AN cable connected to the master device 100 and the back panel information.

The master device 100 is connected to the slave device 200 through the communication control line under which packets are transmitted.

Figure 5:
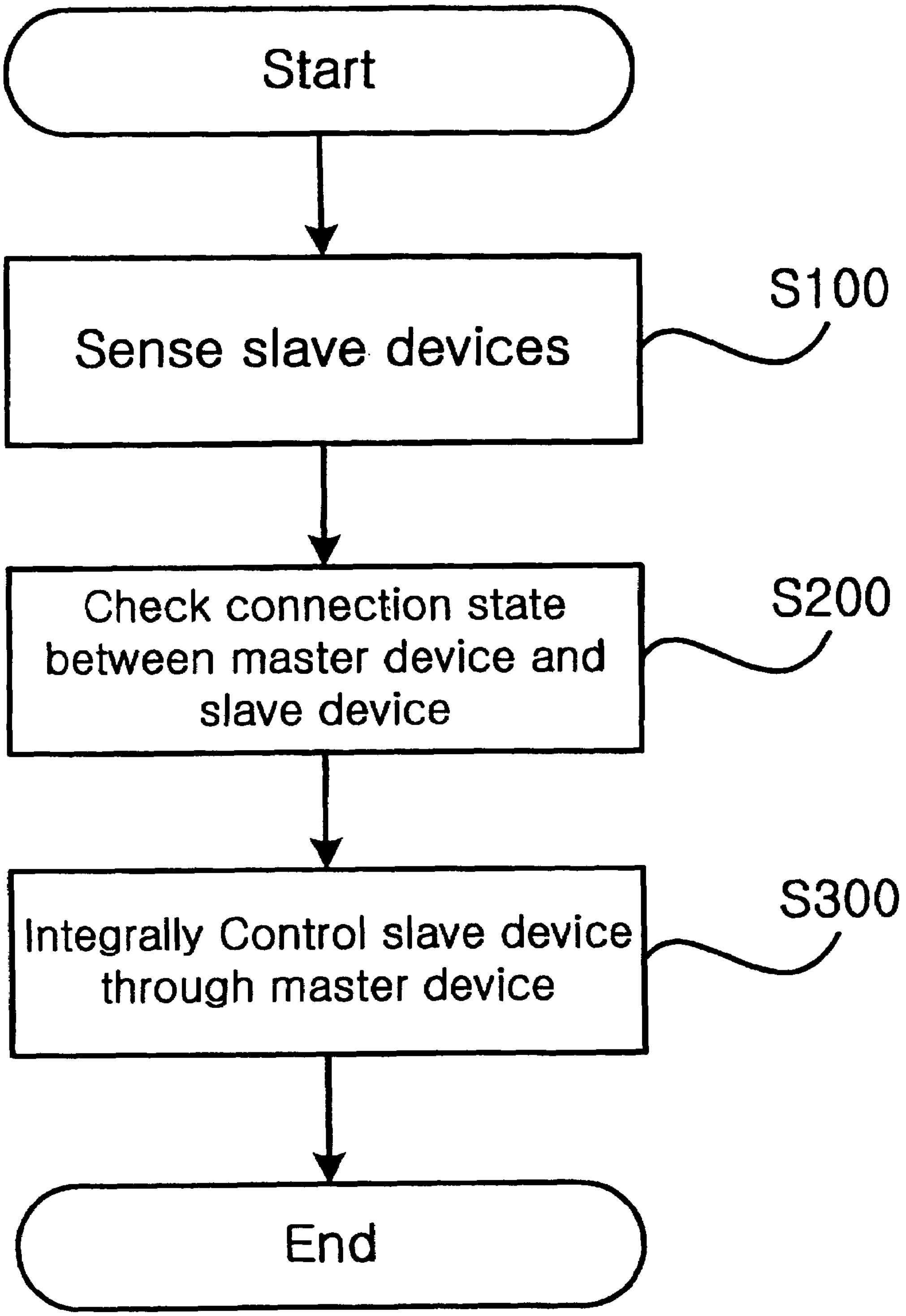
FIG. 5 is a view showing how to control an A/V system available for integrated control in accordance with the present invention.

FIG. 5 is a view showing how to control an A/V system for integrated control in accordance with the present invention.

Firstly, the master device 100 allocates ID to each of the slave device 200 in order to detect the slave device 200 existing on a network (S100). Here, the ID can be allocated by obtaining a fixed ID of the slave device 200 or by automatically allocating an ID to the slave device 200. This will be explained in detail with reference to FIG. 6A and FIG. 6B.

Next, the master device 100 checks a connection state of the slave device 200 based on the ID which is allocated to the slave device 200 (S200). That is, to calculate an optimal connection configuration, the master device 100 requests back panel information of the slave device 200, and checks a current connection state by controlling ON/OFF of the slave device and by checking plug types of the slave device. Hereinafter, a detailed explanation will be given with reference to FIG. 7.

A user controls the slave device 200 connected to the master device 100 on the basis of the checked connection state, through a predetermined user interface provided by the master device 100 (S300). Hereinafter, a detailed explanation will be given with reference to FIG. 8.

Figure 6A:
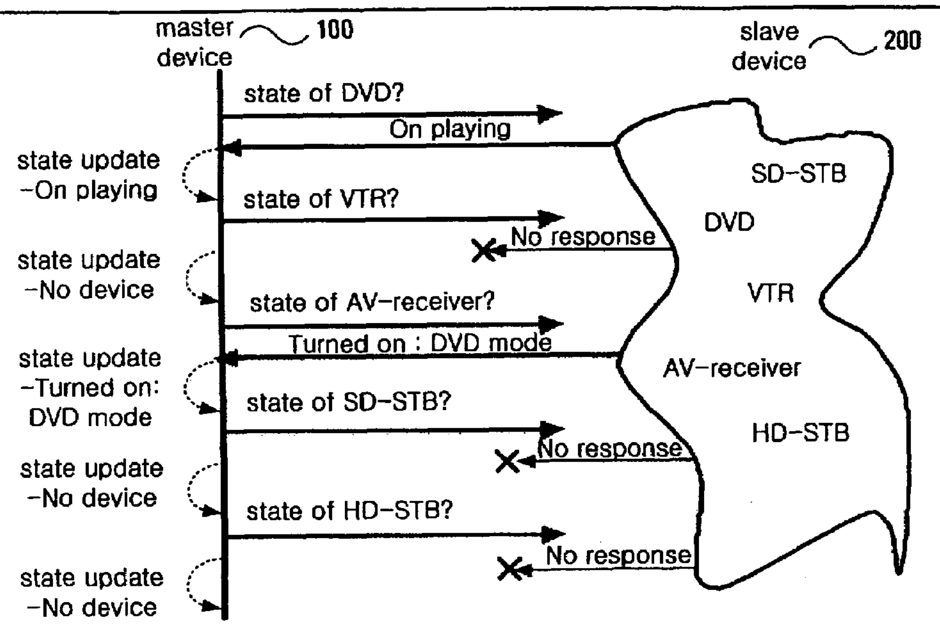
FIG. 6A is a view explaining how a fixed ID is allocated to the slave device.
Figure 6B:
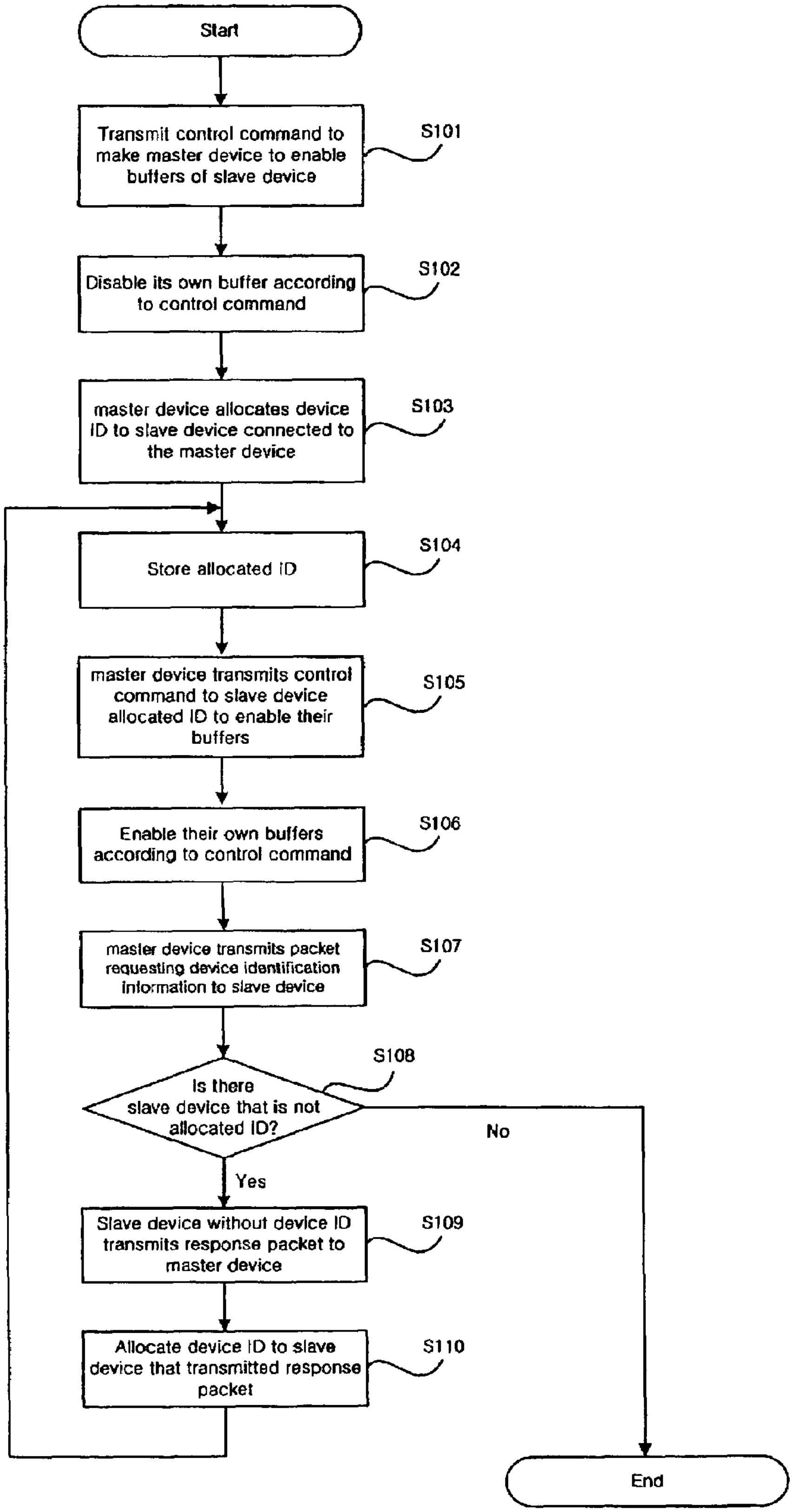
FIG. 6B is a view explaining how an ID is automatically allocated to the slave device.

FIG. 6A, FIG. 6B, and FIG. 6C show how to obtain device information of a slave device existing on a network, wherein FIG. 6A is a view explaining how a fixed ID is allocated to the slave device, FIG. 6B is a view explaining how an ID is automatically allocated to the slave device, and FIG. 6C is a view checking whether to delete a slave device on a network, with respect to automatic allocation of an ID to the slave device.

At first, referring to FIG. 6A illustrating allocation of a fixed ID to the slave device, there are shown slave device such as a DVD, a VTR, an A/V-Receiver on a network, and each of the slave devices is allocated a fixed ID as shown in Table 1.

TABLE 1

| | Device | | | | | |
|---|---|---|---|---|---|---|
| | DVD | VTR | Combo | A/V-Receiver | SD- STB | HD- STB |
| ID | 0 × 01 | 0 × 02 | 0 × 03 | 0 × 04 | 0 × 05 | 0 × 06 |

With reference to FIG. 6A, the master device 100 asks each of the slave devices 200 about their respective states, and each of the slave devices 200 informs the master device 100 of its own state information. By doing so, the master device 100 can identify the slave devices 200 existing on the network based on responses from the slave devices 200, and the master device 100 can obtain an ID of each of the slave devices since the fixed ID has been allocated to each of the slave devices 200.

Automatic allocation by the master device 100 of an ID to the slave device 200 as illustrated in FIG. 6B has been suggested to overcome a problem caused due to allocation of fixed IDs when there are identical slave devices. For example, when the ID of the peripheral equipment 200 is fixed but there are two DVDs, it is not possible to control the DVDs. However, by automatically allocating different IDs to the DVDs, they are identified as different devices and a user can control both of them individually.

With respect to automatic allocation of an ID to the slave device, a method to allocate an ID to the device using a separate buffer control circuit will be explained. The buffer control circuit is one that is used for the purpose of disconnecting a lower network so that only one slave device can communicate with the lower network in the process of allocating the slave device with an ID. That is, by disabling its own buffer 30, the slave device to which an ID is allocated cannot communicate with its lower network. Therefore, the slave device can only communicate with the master device 100 so that the slave device can be solely allocated an ID.

With reference to the flow chart illustrated in FIG. 6B, when the master device 100 wishes to allocate IDs to slave devices 200 connected through a communication line, it transmits a control command to disable the buffer 30 to slave devices 200 (S101), and then slave devices 200 disable their buffers according to the control command from the master device 100 (S102).

In accordance with this, the slave devices other than the slave device 200 connected directly to the master device 100 are in a disabled state, thereby allowing only the slave device 200 connected directly to the master device 100 to communicate with the master device 100. Accordingly the master device 100 allocates an ID to the slave device 200 in connection with the master device 100 (S103), and the slave device 200 allocated the ID from the master device 100 stores the ID in a memory (S104).

Next, the master device 100 transmits a control command to enable the buffer 30 to the slave device allocated the ID, and accordingly the slave device 200 allocated the ID allows the other slave devices in the lower network to communicate with the master device 100 by enabling its own buffer 30 (S105 and S106).

Thereafter, the master device 100 transfers a packet requesting device identification information (for example, "Who Are You" packet) of a slave device in order to find a slave device 200 allocated no ID, and the slave device 200 allocated no ID transmits the response packet (for example, "Who I Am" packet) to the master device 100. Accordingly, the slave device having no ID can be allocated a new ID from the master device 100 (S107 to S110).

Next, the slave device allocated a new ID enables its own buffer 30 for a next slave device, so that the master device 100 is connected to a plurality of slave devices allocated the IDs and connected to only one slave device without an ID.

Next, after the master device 100 allocates an ID to the last slave device, there is no slave device allocated no ID, and accordingly the process in which the master device 100 allocates IDs to the slave devices 200 on the entire network is terminated.

On the other hand, a method how to allocate an ID to the slave device 200 with respect to automatic allocation of the ID to the slave device 200 will be explained in reference to a case that the network is connected in parallel (for example, the connection is made through the IEEE 1394 connection line). The master device 100 disables all connections to the slave devices connected through a communication control line OFF. Then, the master device enables a connection to only one slave device, thereafter allocating an ID to the slave device. And then, the master device 100 enables a connection to the next slave device.

Next, the master device 100 transmits a packet requesting device identification information of the slave device (for example, "Who Are You" packet) in order to identify the slave device allocated no ID, and the slave device without the ID transmits a response packet (for example, "Who I Am" packet) to the master device 100. By doing so, the master device 100 can allocate a new ID to the slave device without the ID.

Next, the master device 100 enables a connection to the next slave device, and the master device 100 can allocate IDs to all slave devices existing on the network.

FIG. 6C is a view showing checking whether to delete a slave device on a network for automatic allocation of an ID to a slave device, wherein the master device 100 always has to check whether to add or delete the slave device 200 connected through a communication control line.

A method to determine whether to determine the slave device 200 connected to the master device 100 through the communication control line will be explained. As shown in this figure, the network connected through an RS-232C cable updates the state of the network by a user's request or under a requirement of the master device 100, when the network is used. At this time, state information on the slave device 200 that is already registered (or allocated ID) is reflected. However, when there is no response from the slave device 200, it is determined that the slave device 200 has been deleted, and the corresponding ID of the slave device 200 is deleted from a list.

Next, a method to determine whether a new slave device has been added on the network will be explained. The master device 100 on the network connected through the RS-232C cable cannot identify automatically whether the new slave device 200 has been added. Therefore, in order to identify whether the new slave device 200 has been added, it should be confirmed whether any slave device 200 allocated no ID exists on the network. Here, since several slave devices 200 cannot be registered simultaneously, the slave device 200 having no ID disables the buffer, and the controlled device 200 having an ID enables the buffer. That allows unregistered slave devices to be registered one by one.

Figure 7:
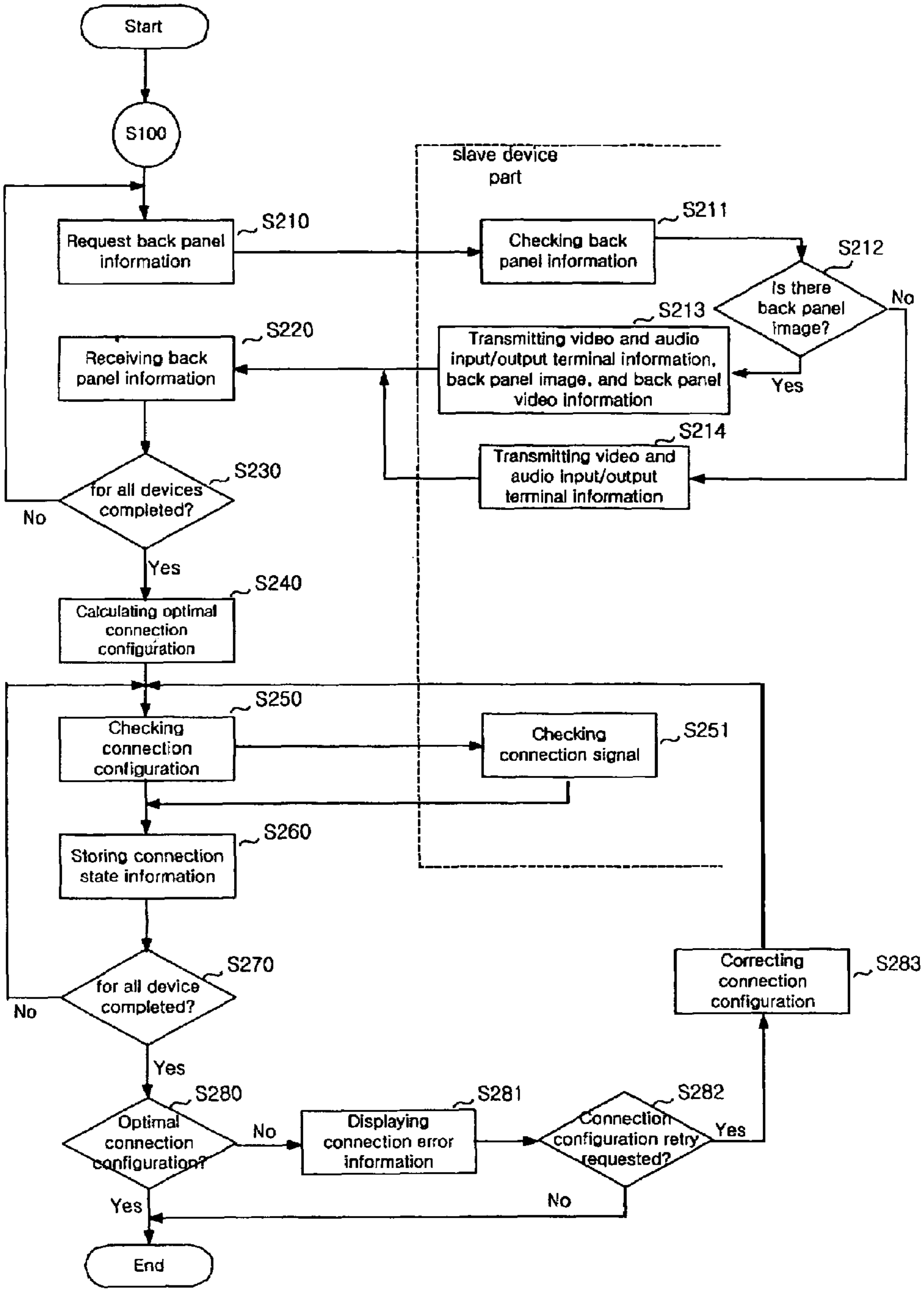
FIG. 7 is a flow chart showing a method how to configure device connections between master device and slave devices in accordance with the present invention.

FIG. 7 is a flowchart showing a method for configuring device connection between a master device and slave devices according to the present invention.

First, if a user connects the master device and the slave devices to the network using communication control lines such as RS-232C cables or the like, the master device senses the slave devices connected to the network and allocates a unique identifier to each of the respective devices (S100).

Next, thee master device sends a command to request the back panel information to the slave devices each having the given unique identifier over the communication control line, such as a RS-232C cable or the like, using a predetermined protocol according to the user's input (S210). If the slave devices receiving the back panel information request command check their own back panel information (S211) and send their back panel information to the master device using the predetermined protocol via the communication control lines, such as the RS-232C cables or the like (S214), the master device receives the back panel information (S220).

If the slave device has its back panel image (S212), the slave device sends the back panel information along with the back panel image (S213). The detailed example regarding the back panel information will be described upon discussing on FIG. 10.

The process from S210 to S220 is repeated until the master device obtains back panel information for all of the slave devices connected to the network (S230).

The master device derives an optimal connection configuration method over the current network by referring to the back panel information of the respective slave devices (S240). At this time, the optimal connection configuration refers to a configuration for connecting the slave devices and the master device using AV cables so that the user can view and listen to the best quality video and audio possible. For example, it is preferable that a cable set-top box or a DVD player is connected to the component terminal of the master device while an AV receiver or a VCR is connected to the composite terminal of the master device. The details on the optimal connection configuration process will be given in discussion of FIG. 11 below. The master device checks the current connection status according to the derived optimal connection configuration method (S250 and S251), and stores information on the checked connection status (S260). The connection status check is performed on the connected slave device basis and proceeds in sequence until the devices are all checked (S270).

Figure 9:
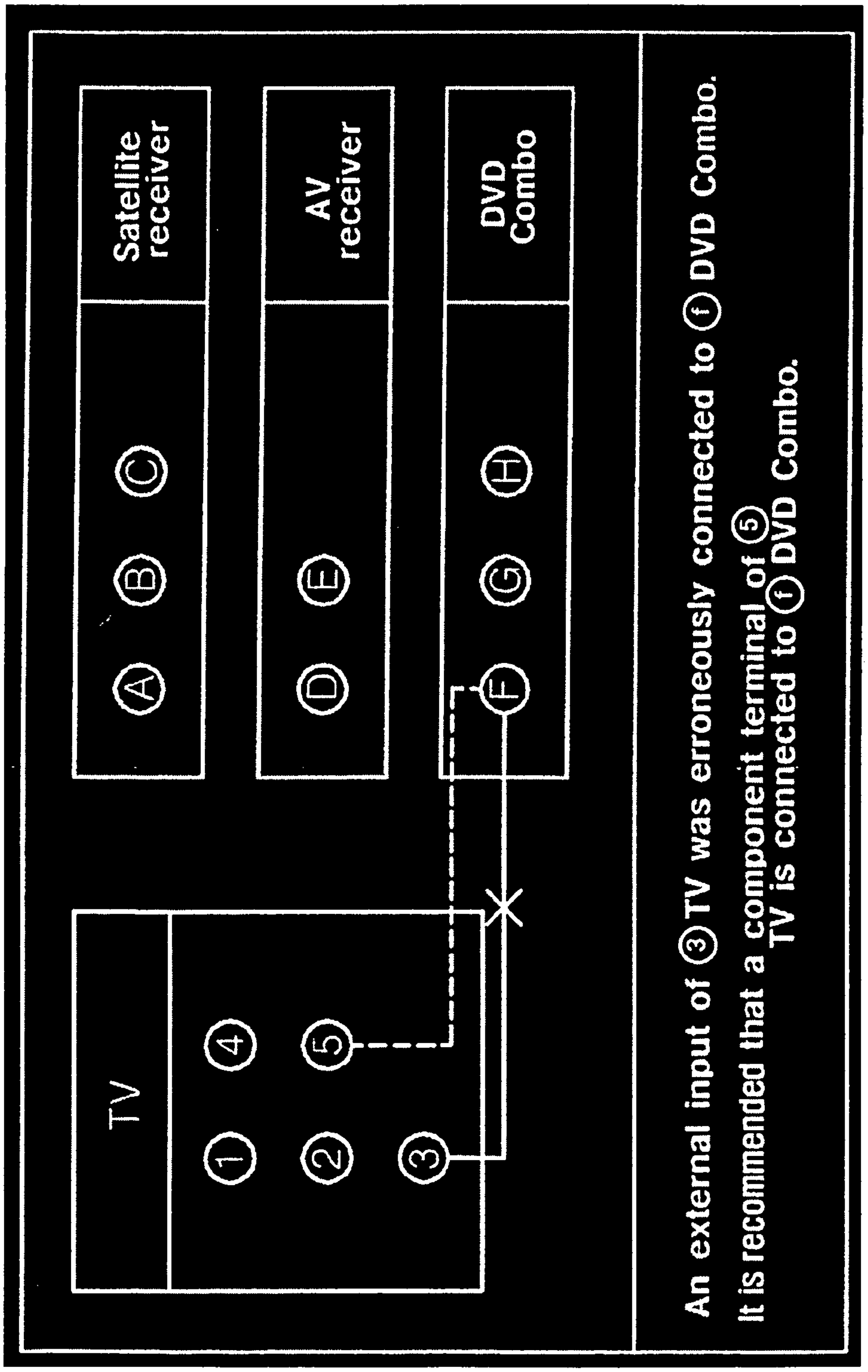
FIG. 9 is a view showing an example of an configuration error screen.

If an optimal connection is established (S280), the user is notified that the correct connection is configured and the process is normally ended. If the correct connection is failed (S280), a connection configuration error screen is displayed to the user (S281). FIG. 9 illustrates an example of the configuration error screen. If such an error exists, it is notified through the screen or the sound that the terminal connection between specific numbers is incorrect, and the correct connection method is suggested on the screen. If the video or audio is not output because of an incorrect connection configuration, the user should directly correct such an error as described above.

Meanwhile, even though the connection configuration is not optimal but video and the audio are output (for example, the DVD player is connected to the composite terminal of the master device), it is first displayed on the screen that there is an error. However, since in this case the user may not want to change the configuration, a chance is given to the user to allow the user to determine whether to re-attempt the connection configuration (S282). If the user determines to re-attempt the connection configuration, the steps from S250 are again performed according to the connection configuration modified by the user (S283), otherwise the process is ended. A process in which the user modifies the connection status will be discussed. The user connects slave devices to the master device on a step-by-step basis according to the connection error information and the correct connection configuration guide displayed on the screen and then performs the steps from S250 again, and thus is allowed to check the connected result. At this time, if the user couples AV lines in conformity to the connection configuration upon coupling AV cables, it is notified to the user that the cables are being correctly coupled, by outputting sounds and displaying flickering effects on the screen each time the AV line is coupled.

A case where a master device and a DVD player are present in the system of the present invention will be described by way of example based on the operation sequence of FIG. 7. First, the user connects the master device to the DVD player using the communication control line, such as an RS-232C cable or the like. In response thereto, the master device senses the existence of the DVD player by communicating with the DVD player connected to the network over the control line (S100). Next, the user clicks a particular button on the remote control to cause the master device to perform connection configuration to the DVD player. The master device displays a guide screen on its screen.

The master device transmits a back panel information request command to the DVD player using a promised protocol (S210). The DVD player checks the back panel information according to the command transmitted from the master device (S211) and sends its back panel information to the master device using a promised protocol in response to the transmission request (S214). At this time, the back panel information includes one component output terminal, one external input terminal, one external output (monitor output) terminal, one digital audio (optical) output, one antenna input, and one antenna output.

The master device determines that the current optimal connection method for connecting the DVD player over the network is to employ the component output terminal and the digital audio output terminal, by referring to the back panel information received from the DVD player (S240).

The master device checks the current connection status according to the derived connection configuration method (S250). That is, the master device checks whether an AV line is coupled from the DVD player to one of master device's component inputs and a signal is incoming over the AV line. Further, the master device checks whether a digital audio from the DVD player is output at the digital audio (optical) input terminal.

If a user did not yet couple the AV line, the check result is displayed as an error due to non-connection (S281). The user couples the AV line according to a connecting method displayed on the screen, namely, to a guide screen to couple the component input terminal of the master device to the component output terminal of the DVD player (S283). At this time, if the component input terminal of the master device and the component output terminal of the DVD player are correctly connected to each other, the master device outputs a sound to notify that the correct configuration has been made. Next, the user connects the digital audio input terminal of the master device and the digital audio output terminal of the DVD player using a digital audio line.

The user clicks a reset button displayed on the screen to allow the master device to check the connection configuration again. If it is checked that the optimal connection is established, the master device notifies to the user through the screen and sound that the normal connection has been established. Thus, it is possible to easily perform AV line connection on a step-by step basis since notification is provided through the sound output when the user correctly connects between respective input and output terminals of the slave devices.

In addition, it is possible to provide animation effects that cause lines connecting between the master device and the DVD player to move and flicker. Further, when color discrimination is required, lines, plugs attached to ends of the lines, or the like are marked with different colors so that further visual effects are provided. Although the embodiment of the present invention has been described in connection with the master device as the TV, any master device may be applied only if the master device can display an image and has input and output terminals for connection to external slave devices. As an example, the master device may be an analog master device receiver, a digital master device receiver, a set-top box receiver, or the like. Alternatively, a PC may be a master device and the master device may be a slave device.

Figure 8:
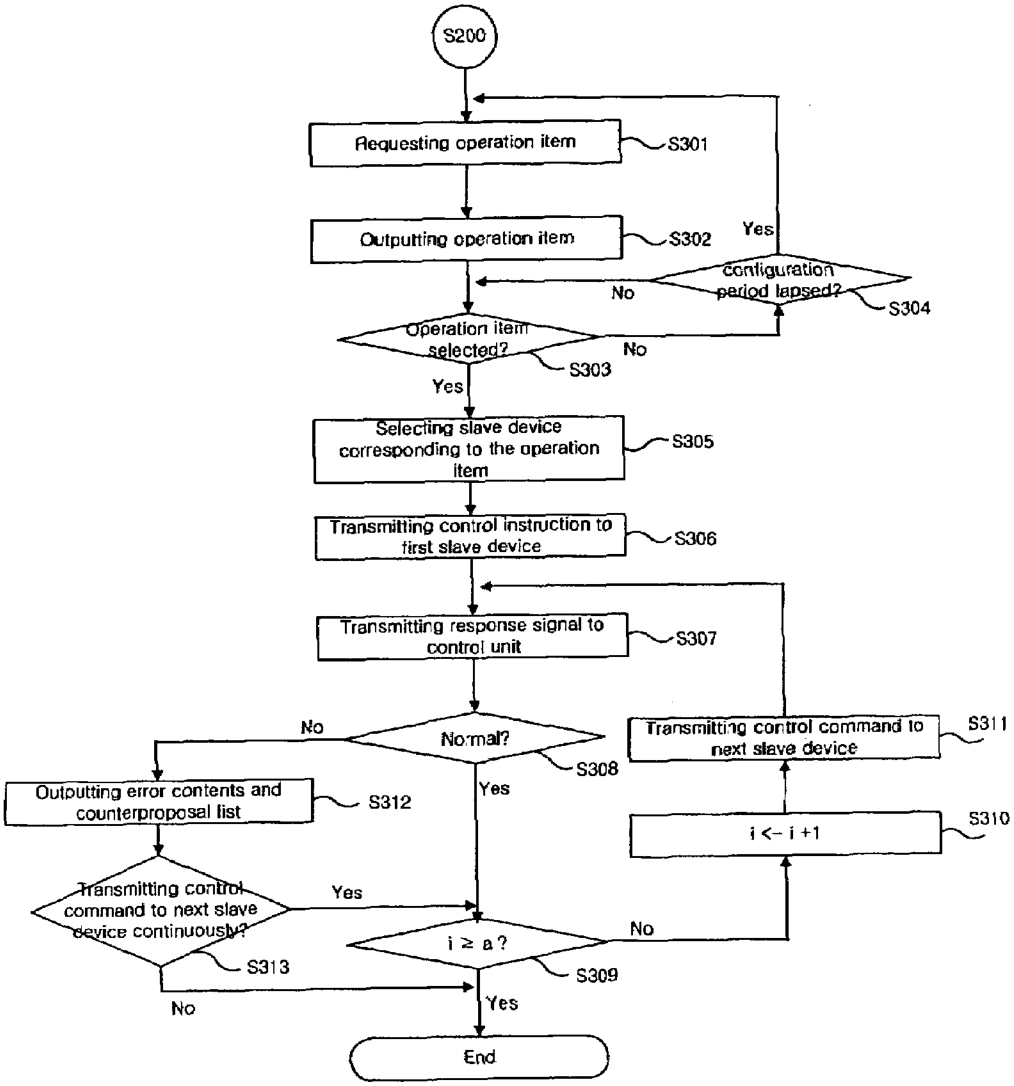
FIG. 8 is a flow chart showing a method for controlling a plurality of slave devices in an integrated manner in accordance with the present invention.

FIG. 8 is a flow chart showing a method for controlling slave devices in an integrated manner in accordance with the present invention, wherein a user requests an item to operate (hereinafter referred to as "operation item") when he/she wishes to control a predetermined slave device 200 (S301).

Next, according to the user's request, the control unit 170 expresses a mapping table stored in the memory unit 130 in the item to operate so as to allow the user to identify, and outputs the item to operate through the display unit 140 (S302). Here, the mapping table comprises a control operation according to state information of the slave device 200, and the slave device 200 is thus controlled according to the established control operation when the user's key code value is input. A method for making the mapping table will be described in detail with reference to FIG. 19 to be described later.

Next, the user selects a desired operation item among the operation items output through the display unit 140 (S303). Here, the operation item is made with a hierarchy structure in order that items having a large field to then subdivided fields can be selected. When the user has selected an operation item including an item of lower priority operation, the corresponding item of lower priority operation is outputted. Also, the operation item may be added or deleted as the number of the slave device 200 connected to the communication control line increase or decrease.

Figure 15:
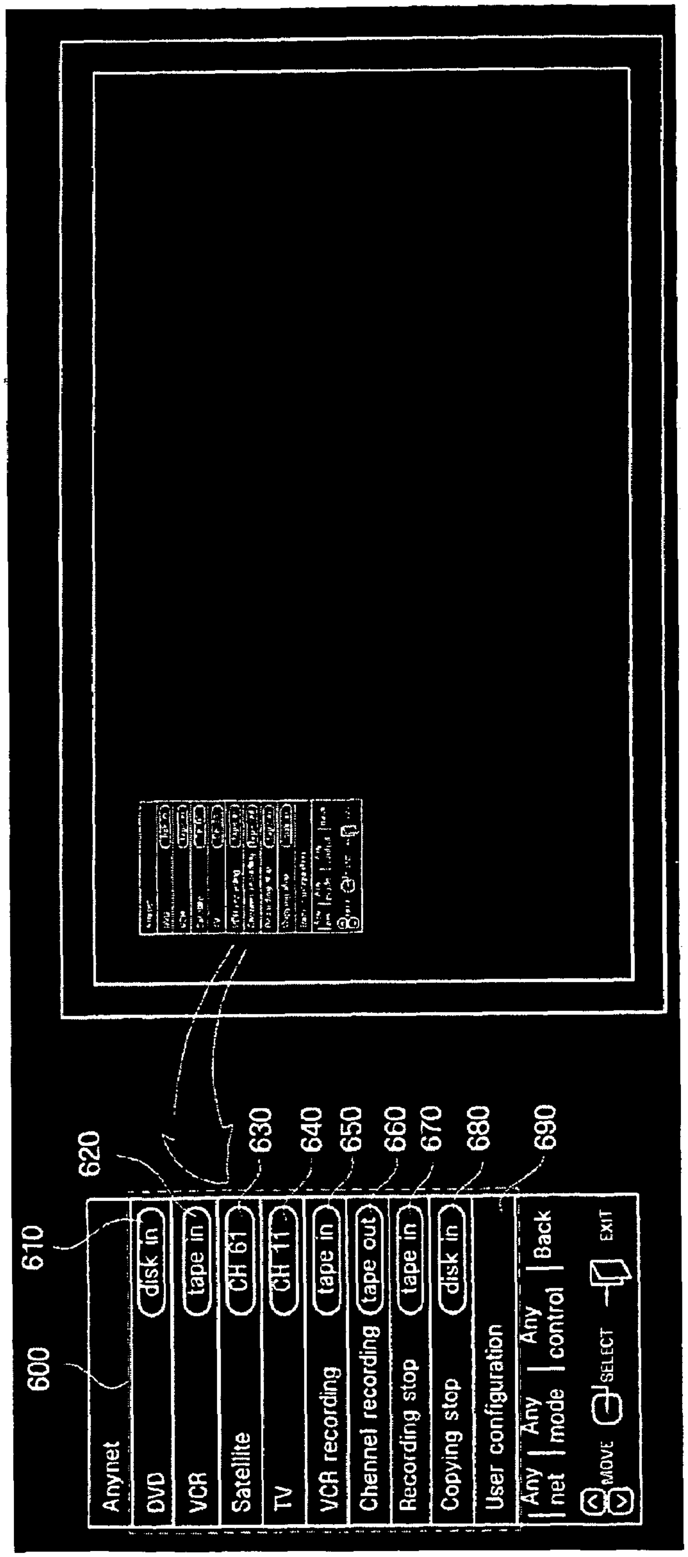
FIGS. 15 to 17 are views showing user interfaces in accordance with the present invention.

For example, when the user wishes to control a predetermined slave device, an operation item 600 which is expressed so as to allow the user to identify the mapping table which can control one or more slave device 200 is outputted through the display unit 140 as shown in FIG. 15. That is, when the user selects any one of DVD viewing 610, VCR viewing 620, satellite broadcasting viewing 630, TV viewing 640 and current video recording 650, the master device 100 transmits a control command according to the mapping table corresponding to the selected operation item to the relevant slave device 200 since no lower priority operation exists.

Figure 16:
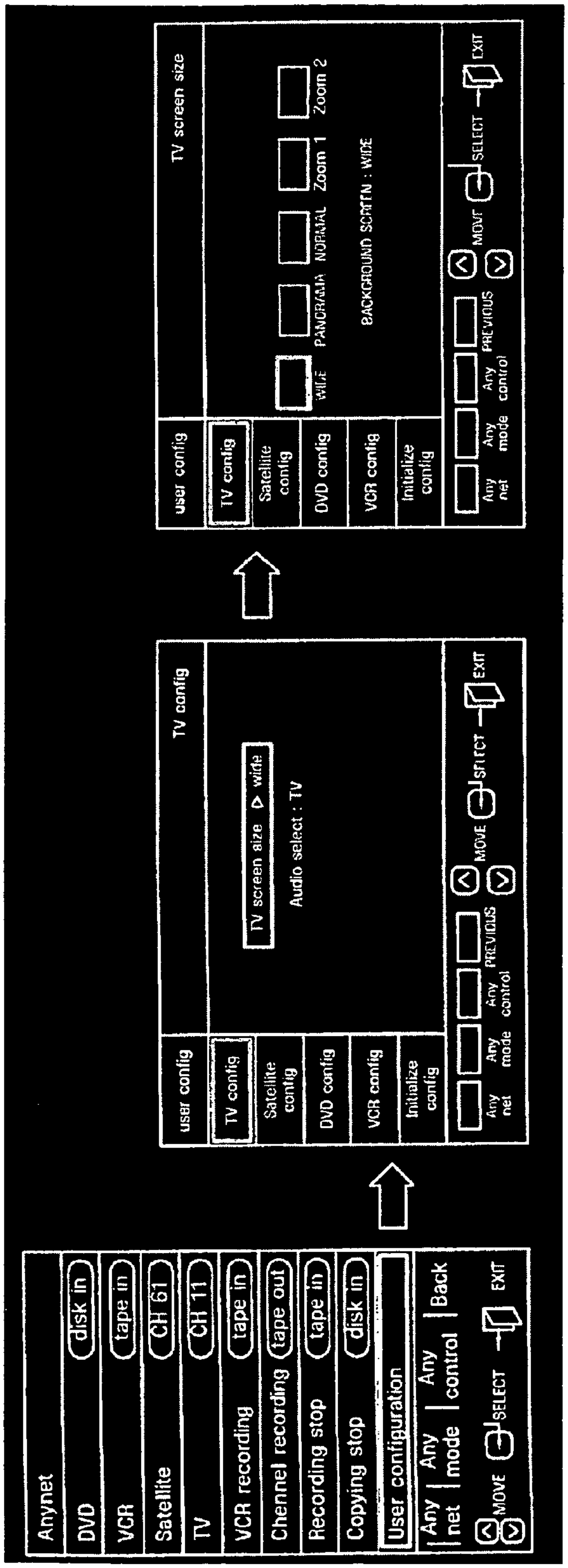

On the other hand, when the user selects any one of assigned channel recording 660, reserved recording 670, DVD copying 680 and user configuration 690, the lower priority operation item is outputted as shown in FIG. 16 so that the user may select more subdivided operation items.

Figure 17:
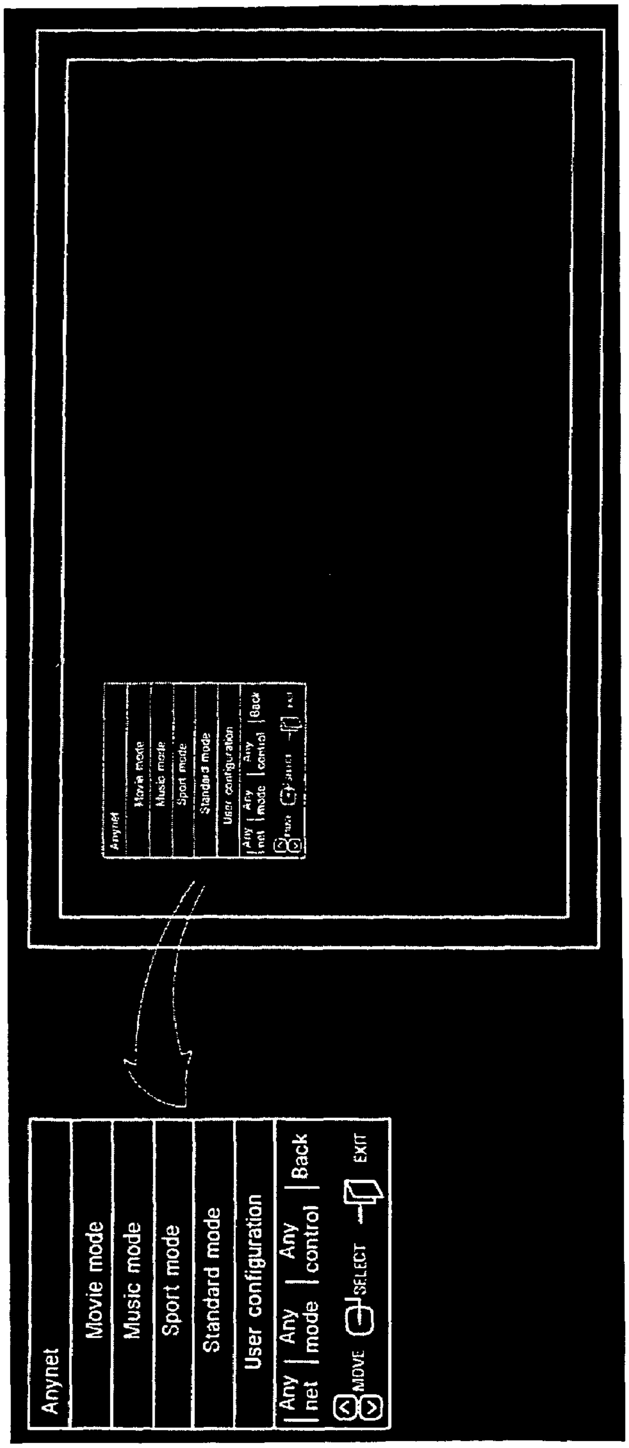
Figure 18:
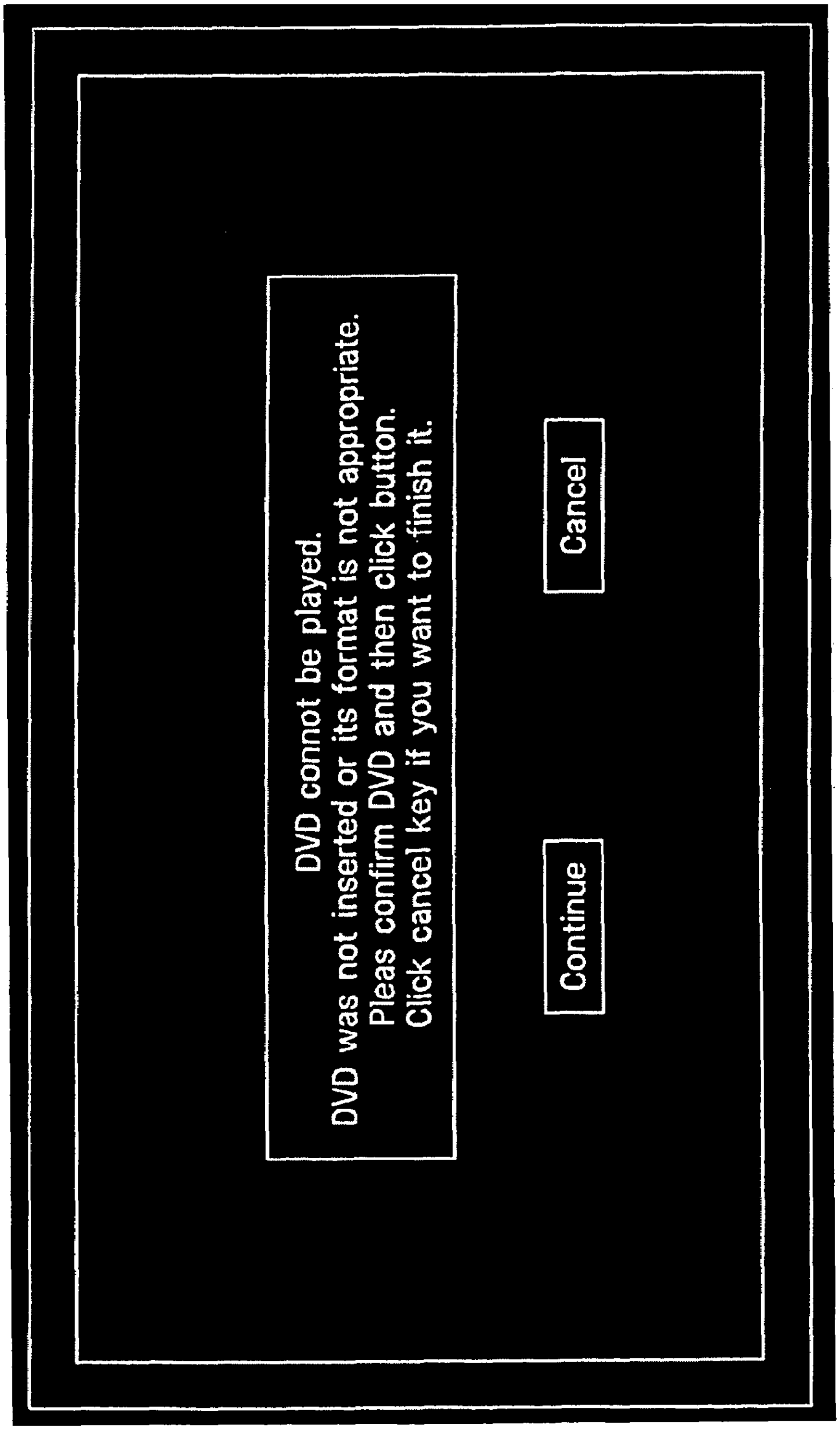
FIG. 18 is a view showing error content and a counterproposal list used in performing a slave device operational command in accordance with the present invention.

Also, when the user requests a user interface in order to change the current viewing screen mode and a sound field mode, a mode item 700, which is so expressed as to allow the user to identify a mode command list to establish the screen mode or field mode of the corresponding slave device is outputted as shown in FIG. 17.

On the other hand, when the user does not select the operation item for the established period of time, the operation item output through the display unit 140 disappears and the user waits for until the user's request (S304) is issued.

If the user selects a predetermined operation item, the slave device 200 corresponding to the selected operation item is selected (S305), and it is assumed that the number of the slave devices 200 involved in the selected operation item is "a".

Next, when the slave device 200 corresponding to the selected operation item is selected, the control unit 170 transmits the control command to the first slave device 200 according to a predetermined order (S306).

For example, when the first slave device is the DVD player, the control command is issued to perform operations to check the DVD player power on and the DVD title insertion, and a response signal according to the transmitted control command is transmitted to the control unit 170 from the slave device 200 (S307).

Here, the control unit 170 determines whether the corresponding slave device operates normally through the response signal (S308), and confirms the number of slave devices, having passed the determination (S309).

Next, when the number (i) of the slave devices which has passed the determination is smaller than that of the slave devices corresponding to the operation item as a result of the confirmation, the control unit 170 increases a count in order to transmit the control command to the slave device having the next priority (S310), and then transmits the control command to the next slave device according to the increased count (S311).

Thereafter, the user increases the count as many as the number of the slave devices corresponding to the selected operation item, and repeats the process of determining whether the slave device operates normally through the transmission of the control command and a response signal to the control signal.

That is, the control unit 170 transmits the control command to all slave devices corresponding to the operation item selected by the user, and determines whether all slave devices involved in the selected operation item operate normally, by repeating the process until the control unit receives a response signal to the command.

At this time, when all slave devices operate normally as a result of determination according to the response signal transmitted from the slave devices, the slave device corresponding to the operation item selected by the user normally operate accordingly.

If there exists the slave device having an error among the slave devices involved in the operation item selected by the user, the control unit 170 outputs the content of an error and a counterproposal list to solve the error through the display unit 170 (S312).

That is, as shown in FIG. 17, when a DVD title was not inserted into the DVD player, the content of an error due to this state is outputted and the counterproposal list to solve the error is outputted to the user.

Such a counterproposal list is sorted in the memory unit 130 according to the control command included in the command list and stored, and the control unit 170 reads out the counterproposal list corresponding to the control command from which an error is caused from the memory unit 130 and then outputs it.

Next, it is determined whether the control command is to be transmitted to the slave device having the next priority, based on the displayed error content and the counterproposal list (S313).

FIG. 10 is a table for explaining an example of back panel information. If the master device requests back panel information from a slave device, the slave device first reads its back panel information from the memory 230 and then if an additional back panel image is present, the slave device sends the back panel image along with the back panel information. If the additional back panel image is not present, the slave device simply sends only the back panel information to the master device. Examples of such back panel information are divided into a case where an image can be transmitted and a case where an image cannot be transmitted. If an image is present, the back panel information will additionally include center coordinates on an image for each input/output terminal. Although the master device can virtually create a back panel image for a slave device having only back panel information, the image may have a shape different from that of the real back panel. Thus, the master device can preferably configure a more accurate guide screen if the slave device stores its back panel image as an image file and then provides it to the master device.

Figure 11:
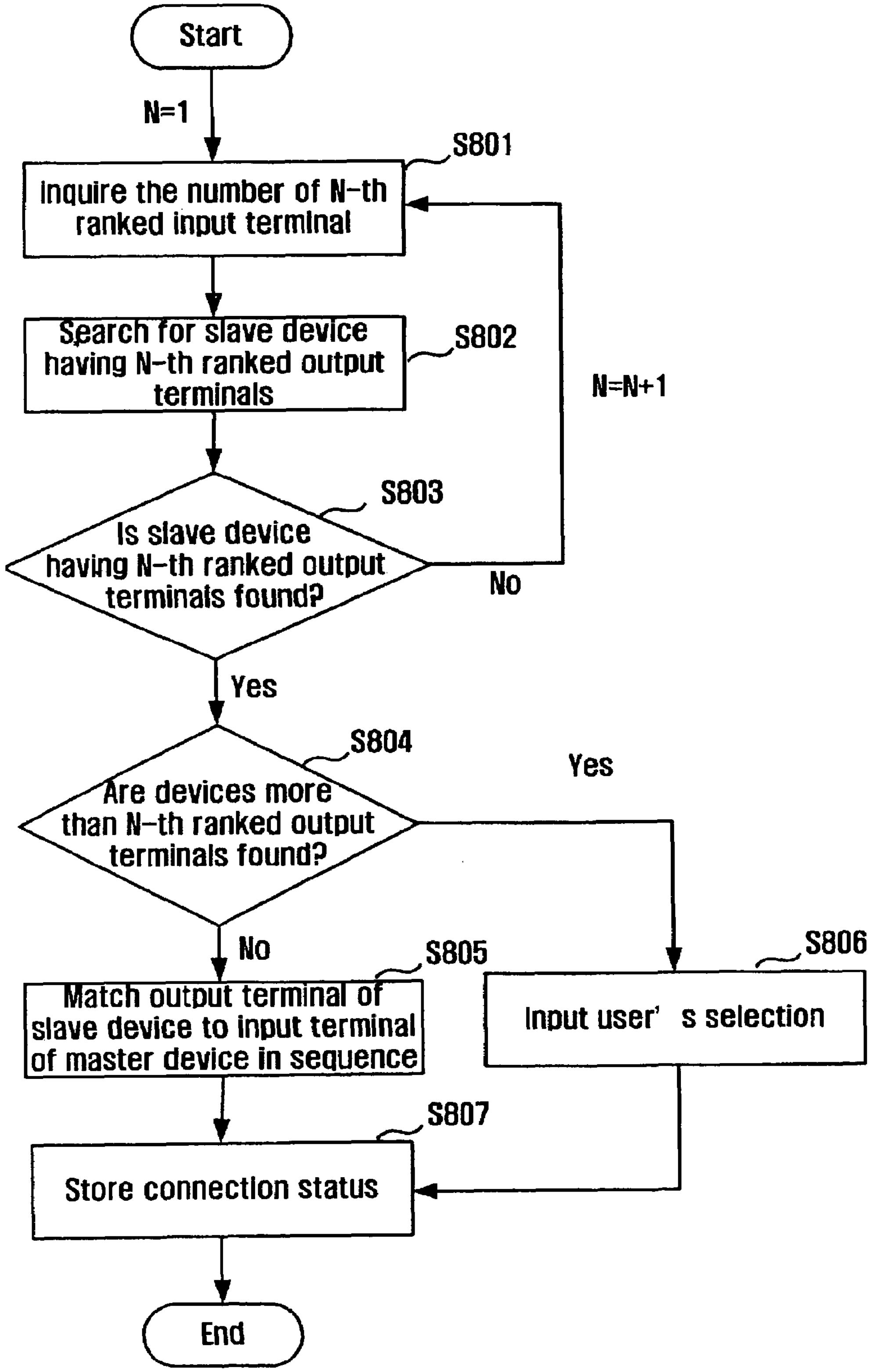
FIG. 11 is a flow chart explaining the process of matching a video input terminal of a TV set with a video output terminal of slave device in detail in the process of calculating an optimal connection configuration in the step S240 of FIG. 7.

FIG. 11 is a flowchart specifically explaining a process of mapping a video input terminal of a master device and a video output terminal of a slave device in computing an optimal connection configuration in step S240 of FIG. 7. To compute the optimal connection configuration, the optimal connection configuration should be done for each of four cases of the input and output of the video signal and the input and output of the audio signal.

First, it is a process of mapping the video input terminal of the master device to the video output terminal of the slave device. For the video, component video, S-VHS video, and external input video have better image qualities in this sequence. In other words, a first ranked signal is the component video, the second is the S-VHS, and the third is the external input video.

Each of the steps will be discussed with reference to FIG. 11. First, the number and type of component input terminals of the master device are inquired (S801). Next, there is a search for a slave device having component output terminals among the slave devices connected to the network (S802). If slave devices meeting the condition are found (S803) and the number of found slave devices is larger than the number of the component input terminals of the master device (Yes in step S804), this fact is displayed to the user and a user's selection is input (S806). If the number of found slave devices is smaller than the number of the component input terminals of the master device (No of S804), the component output terminals of the relevant slave device are mapped to the relevant component input terminals of the master device in sequence (S805). The mapping refers to form pairs in a one-to-one fashion between a terminal and a terminal in a table form. Connection status of the mapped slave device is stored (S807). If a slave device has not been found in step S803, it proceeds to a process of inquiring a subsequent lower terminal.

The number and type of S-video input terminals of the master device is inquired (S801). Next, there is a search for all slave devices having S-video output terminals among other slave devices connected to the network (S802). If slave devices meeting the condition are found (S803) and the number of found slave devices is larger than the number of the S-video input terminals of the master device (Yes in step S804), it is displayed to the user and a user's selection is input (S806). If the number smaller than the number of the S-video input terminals of the master device is found (No of S804), the S-video output terminals of the relevant slave device are mapped to the relevant S-video input terminals in sequence (S805). The connection status of the mapped slave device is stored (S807). If the slave device is not found in step S803, which means that there is no slave device having S-video output, it proceeds to a process of inquiring a subsequent lower terminal.

The number and type of external input terminals of the master device is inquired (S801). Next, slave devices having external output terminals among other slave devices connected to the network are all searched for. If slave devices meeting the condition are found (S803) and the number of found slave devices is larger than the number of the external input terminals of the master device (Yes in step S804), it is displayed to the user and a user's selection is input (S806). If the number of found slave devices is smaller than the number of the external input terminals of the master device (No in step S804), the external output terminals of the relevant slave device are mapped to the relevant external input terminals in sequence (S805). The connection status of the mapped slave device is stored (S807). If a slave device is not found in step S803, which means that there is no slave device capable of outputting video, the process is ended.

Second, it is a process of mapping video output terminals of the master device to video input terminals of a slave device. In this case, it also suffices to use the same method as the inputting case.

The number and type of component output terminals of the master device is inquired. Next, slave devices having component input terminals among other slave devices connected to the network are all searched for. If slave devices meeting the condition are found and the number of found slave devices is larger than the number of component output terminals of the master device, it is displayed to the user and a selection is input. If the number of found slave devices is smaller than the number of the component output terminals of the master device, component input terminals of the relevant slave device are mapped to relevant component output terminals in sequence. Connection status of the mapped slave device is stored.

The process is repeated for S-video when a slave device has not been found.

When any slave device having S-video input terminals has not been found in the repeated process, the process is also repeated for external video output.

Third, it is a process of mapping audio input terminals of the master device and audio output terminals of a slave device. For sound quality, a first ranked audio is digital audio, and a second ranked audio is analog audio. At this time, it suffices to use the same process used for video input.

Fourth, it is a process of mapping audio output terminals of the master device and audio input terminals of the slave device. It suffices to use the same process as when a video is output from the master device in the sequence of digital audio followed by analog audio.

Figure 12A:
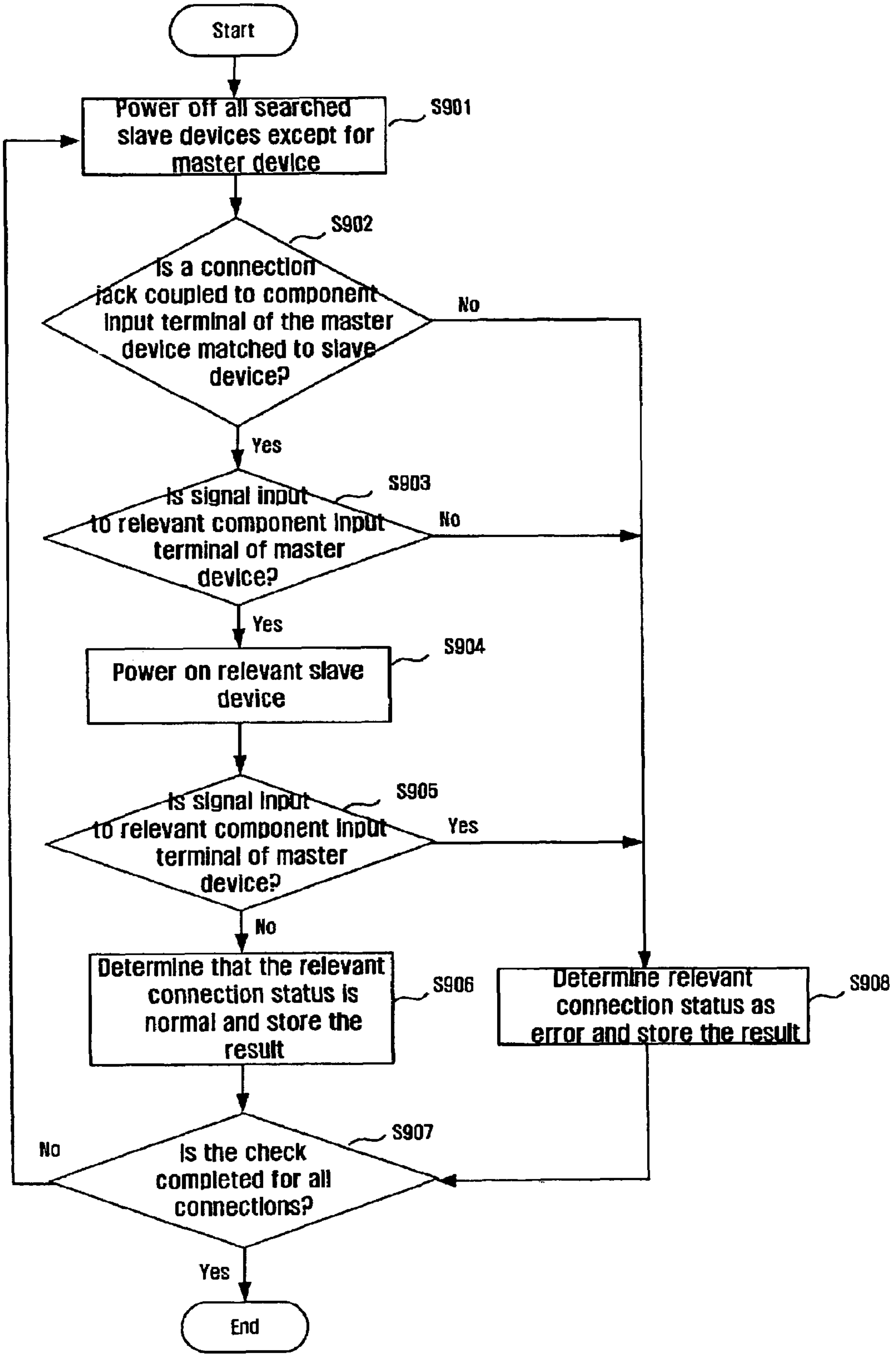
FIG. 12A is a flow chart explaining a process of checking a component video input signal in detail among the processes of checking whether the connection configuration is normal in the process of the steps S250 to S270 in FIG. 7.

FIG. 12A is a flowchart specifically explaining the process of checking a component video input signal in checking whether connection configuration is normal, namely, in recognizing the connection status of AV cables in steps from S250 to S270 of FIG. 7.

First, it is checked whether the video input signal or audio input signal is normal. This process will be specifically discussed.

All searched slave devices except for the master device are first powered off (S901). The slave devices mapped to component input terminals of the master device are first checked. A first slave device among target slave devices is selected as a search slave device and it is checked whether the AV connection cable is coupled to the component input terminals of the master device mapped to a relevant slave device (S902). If the AV connection cable is not coupled, which means non-connection, it is determined to be an error (S908). If the AV connection cable is coupled, it is first ascertained whether any signal is input to the relevant component input terminals of the master device (S903). If the signal is being input, which means that a slave device other than the search slave device is connected, it is determined to be a connection error (S908). Next, only the search slave device is powered on and other remaining slave devices keep all powered off (S904), and it is checked whether a signal is input to the relevant component input terminals of the master device (S905). If the signal is not input, it means that the search slave device is not connected and it is determined to be a connection error (S908). If the signal is normally input in the above step, which means that the search slave device is normally connected, it is determined that the relevant connection status is normal (S906), and the subsequent slave device among the mapped slave devices having component output terminals is selected as the search slave device and then the following steps following the step S901 are repeated.

If all connection checks have been completed for the mapped slave devices having component output terminals, the checks are performed on S-video input terminals, and then on external input terminals.

If the connection check has been completed for all video input signals, the connection check is performed on the digital audio input in the same manner.

If the connection check has been completed for all digital audio inputs, then the connection check is performed on the analog audio input in the same manner, if possible.

Figure 12B:
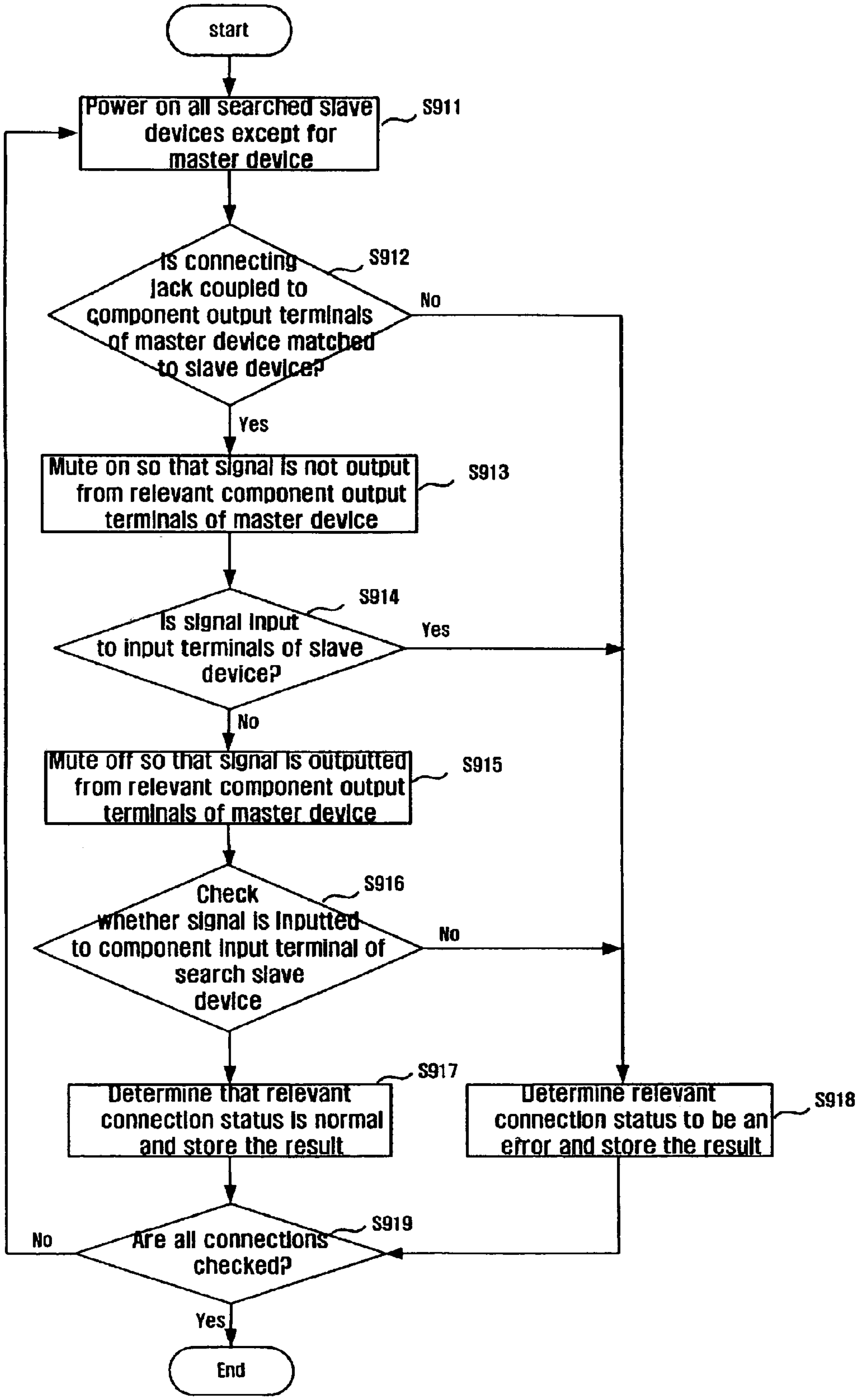
FIG. 12B is a flow chart explaining a process for checking a component video output signal in detail among the processes of checking whether a connection configuration is normal, in the steps S250 to S270 of FIG. 7.

Second, it is checked whether the video or audio output signal is normal. This process will be specifically discussed. FIG. 12B is a flowchart specifically explaining a process of checking a component video input signal in checking whether connection configuration is normal in steps from S250 to S270 of FIG. 7.

First, the searched slave devices except for the master device are all powered on (S911). Devices for which input signals can be checked among the slave devices mapped to the component output terminals of the master device are checked first. A first slave device among the target slave devices is selected as a search slave device, and it is checked whether an AV cable is coupled to the component output terminals of the master device mapped to the relevant slave device (S912). If the AV cable is not connected, which means that there is no connection, it is determined to be an error (S918). Next, mute is on so that a signal is not output from the relevant component output terminals of the master device (S913), and it is checked whether a signal is input to the component input terminals of the search slave device (S914). If a signal is input, which means that another slave device rather than the search slave device is connected, it is determined to be an error (S918). Next, the mute is off so that a signal is output from the relevant component output terminals of the master device (S915), and it is checked whether a signal is input to the component input terminal of the search slave device (S916). If the signal is not input, which means that the search slave device is not normally connected, it is determined to be an error (S918). If the signal is normally input in the above step, which means that the search slave device is normally connected, it is determined that the relevant connection status is normal (S917). A subsequent slave device among the mapped slave devices having the component input terminals is selected as the search slave device and all steps following the third step are repeated for all of the devices.

If all connection check is completed on the mapped slave devices having the component input terminals, then the check is made on S-video output terminals and thereafter the connection check is performed on the external output terminals.

If the connection check is completed on all video output signals, the connection check is performed on the digital audio output in the same manner. If the connection check has been completed on all digital audio outputs, the connection check is performed on analog audio outputs in the same manner when the check can be made on audio output signals.

Figure 13A:
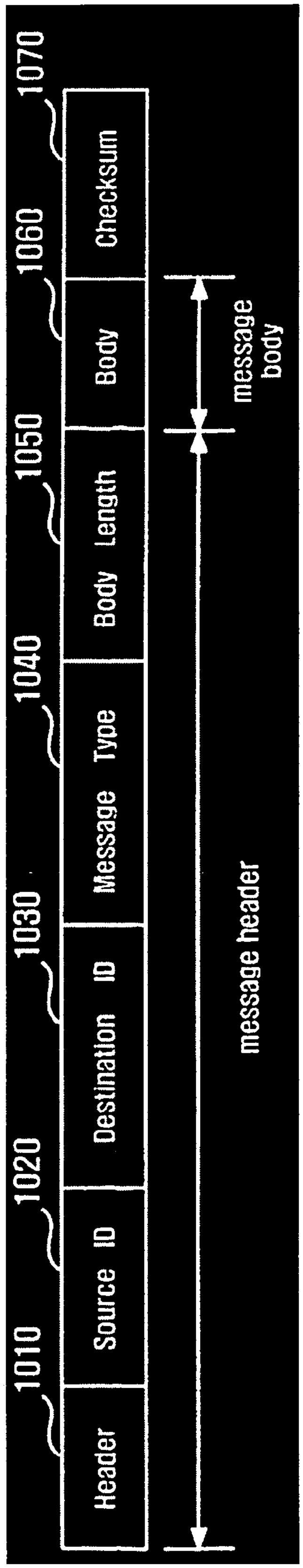

FIGS. 13A to 13D explain an internal structure of a packet for transmitting and receiving information between the master device and the slave device. First, FIG. 13A shows an entire structure (each field name) of the transmission/reception packet. The packet may be composed of a header field 1010 containing discriminator information, a source ID field 1020 containing information for identifying a device for transmitting a packet, a destination ID field 1030 containing information for identifying a device for receiving a packet, a message type field 1040 indicating the type of the packet, a body length field 1050 representing the size of the packet body, a packet body field 1060 containing data to be actually transmitted and received, and a checksum field 1070 used to determine whether there is error in the received packet.

Figure 13B:
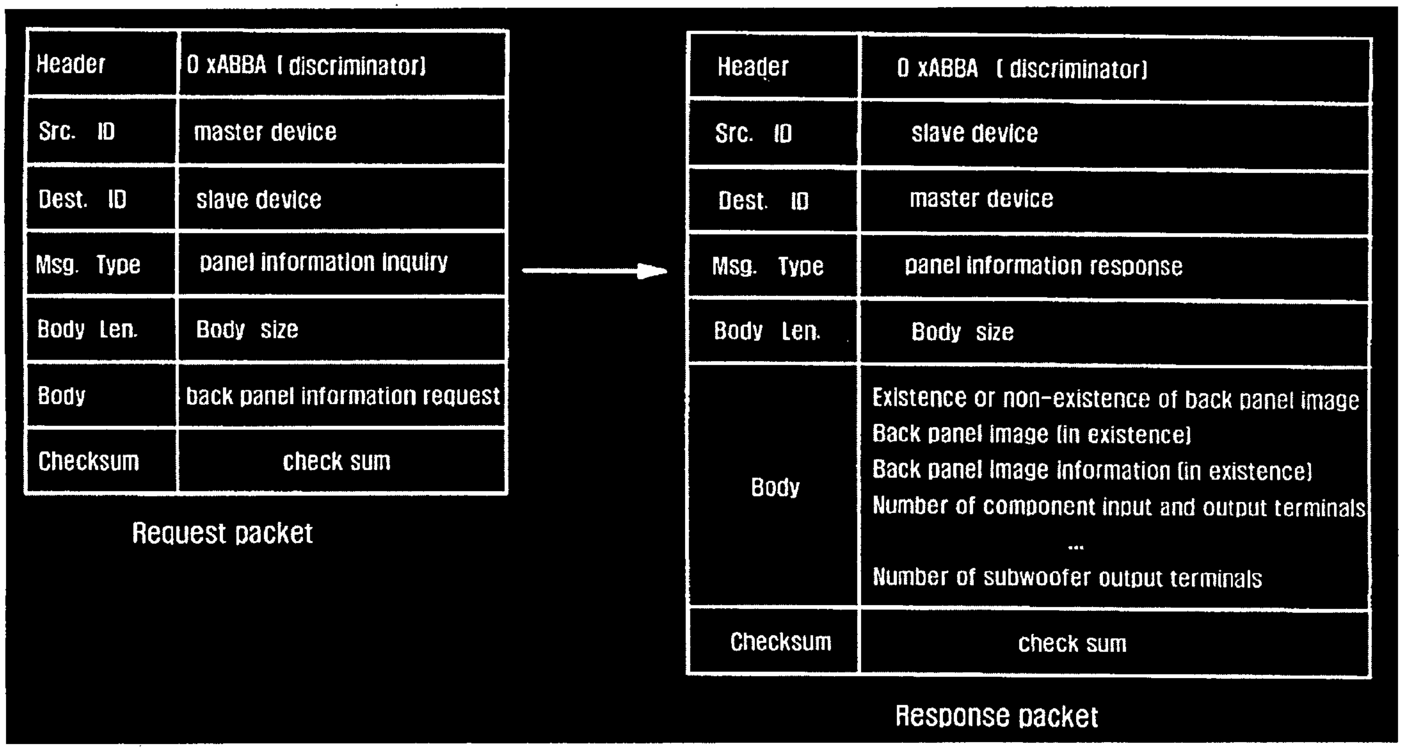

FIG. 13B illustrates an example of field names and contents of a packet used in requesting back panel information in step S210 and responding back panel information in step S213 of FIG. 7. In the back panel information request packet, the unique identifier of the master device is described in the source ID, and the unique identifier of a receiving slave device is described in the destination ID. In back panel information response packet, they are described in reverse. The back panel information, back panel image, back panel image information and the like as listed in FIG. 10 are described in the body field of the back panel information response packet.

FIG. 13C is a diagram illustrating an example of field names and contents of a transmission/reception packet used in requesting to check a connection signal in step S250 and responding check results in step S251 of FIG. 7. 'Inquiry on whether a signal is input' is described in the message type field of the request packet, and 'input terminal of a first component' is described in the body field. It may be used to recognize the status of the input terminals of the receiving side the first component, namely, when desiring to recognize whether it is on/off. In this regard, the receiving side informs the receiving side of the status of input terminals of the first component as a response by describing on/off in the body field of the response packet.

FIG. 13D illustrates an example of field names and contents of a transmission/reception packet used when powering on or off the slave device in FIGS. 12A and 12B. 'Device control command' is described in a message type field of the request packet, and 'power on or power off' is described in the body field. This packet is a packet used when a master device as a transmitting side controls the power supply for a receiving side slave device. In response to the packet, the receiving side slave device transmits a response packet in which the 'success or failure' of the control command is described in the body field.

According to the present invention, it is possible to reduce efforts for a user to find out an optimal connection way though a user's manual in detail by a master device automatically inquiring back panel information of slave devices and obtaining an optimal connection configuration method.

Additionally, the 'Who I Am' response packet with respect to the 'Who Are You' request packet as described in reference to FIG. 3E is also of the same in construction as FIG. 13.

Figure 14A:
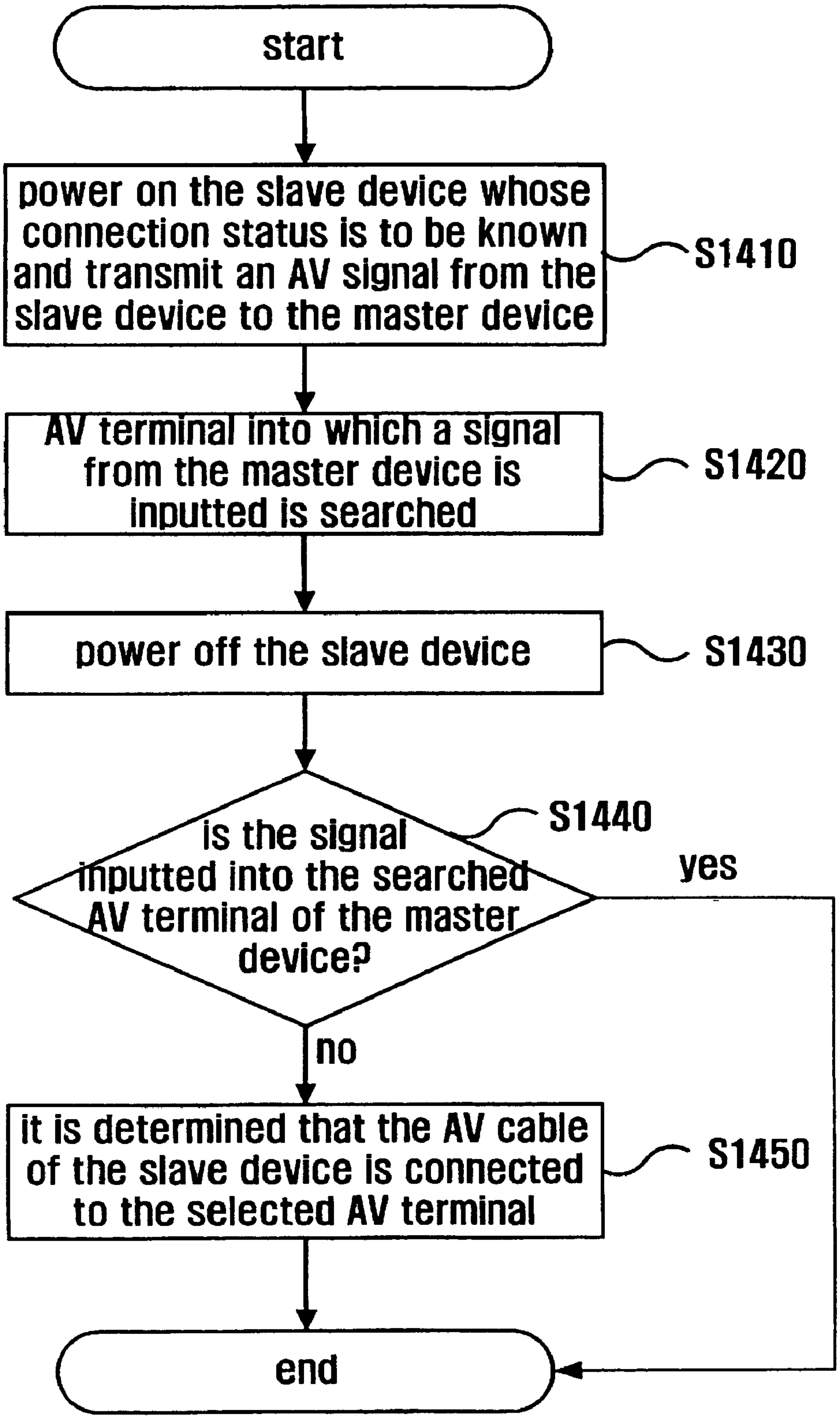
FIG. 14A is a flow chart illustrating a method to know to which slave device each of AV terminals connect.

FIG. 14A is a flow chart illustrating a method to know to which slave device each of AV terminals which a master device has is connected, wherein a method to locate into which terminal of the master device 100 the AV signal of a specific slave device 200 is flown. Actually, assuming that several slave devices 200 exist and they are connected one another through several input terminals 200 of the master device 100 and several AV cables, there is a need to know into which input terminal of the master device 100 the specific slave device 200 flows the AV signal. However, when there are numerous slave devices and AV cables, it may be difficult and troublesome to identify manually to which slave device 200 the AV cable connected to the back panel of the master device 100.

Referring to FIG. 14A, the master device 100 transmits a control signal to power on the power supply to a slave device through a communication control line. This allows the slave device, whose connection status the master device desires to know, to be powered on and allows the slave device to transmit an AV signal to the master device (S1410). Then, an AV terminal into which a signal from the master device 100 is inputted is searched (S1420). Searching for the AV terminal is conducted, into which terminal the signal is inputted by converting an video mode or a sound mode. For example, when the slave device whose connection status the master device desires to know refers to a device outputting an video signal, the master device finds out an input mode of the signal by changing various video modes such as a YPbPr video mode, an S-video mode, an external input video mode. Through this process, it can be searched into which terminal the video signal is inputted.

Then, power off the slave device (S1430) and it is determined whether the signal has been inputted into the searched AV terminal of the master device (S1440). If a signal is inputted although the power supply to the slave device is powered off, the signal input in step S1420 may be a signal from a device other than the slave device. When the signal has not been inputted, it is determined that the AV cable of the slave device is connected to the selected AV terminal (S1450).

Figure 14B:
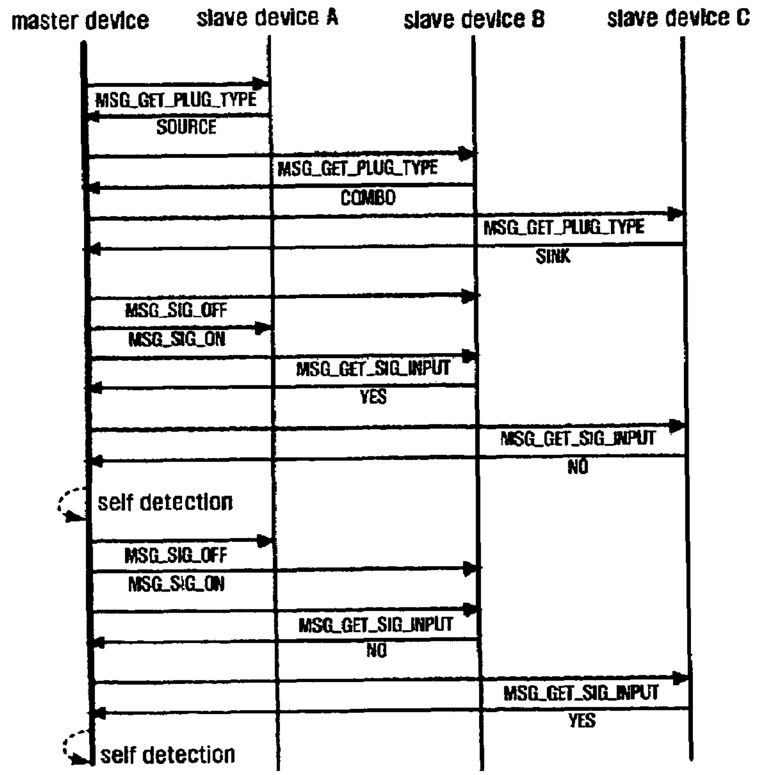
FIG. 14B is a view explaining a method for obtaining state information with respect to slave devices.

FIG. 14B is a view illustrating a method for obtaining state information with respect to slave devices, explaining how to examine a relationship of external input/output of various slave devices besides a master device. Here, obtained information on connection between the slave devices is stored in a mapping table and is used when the master device 100 controls slave devices according to key input by a user.

The slave devices connected to the master device through a communication control line may include various slave devices besides an output device (source device), which needs to be considered when constructing a network including an input/output device (Combo Device) having both input/output plugs, an input device (Sink Device) having the input plug only, and an isolated Device having no input/output plugs. Since the isolated device only support network controls, and it has no input/output plugs, it is not necessary to identify a state of AV cable connection between devices: for this reason, it will not be considered.

With reference to the illustrative drawings, the master device 100 examines the plug types of all slave devices 200 existing on the network and determines only output devices and input/output devices which are to be examined. Then, remaining outputs except one of slave devices having the output plugs are powered off. Also, in order to find out where the one slave device to be outputted is input, a connection state of the plug is identified by searching for input devices and input/output devices having the input plugs.

For example, when each of the output device, input device and input/output device is connected to the master device 100, the master device 100 first identifies the input/output types of all the slave devices 200 on the network, and then makes only one of slave device among slave devices having the output plugs to be outputted and the remaining slave devices not to be outputted.

Next, a current connection state is identified by making a query whether any signal is currently being input into the slave devices having the input plugs. Assuming that slave device A refers to an output device, slave device B refers to an input/output device, and slave device C refers to an input device, only the slave device A is outputted and the slave device B is not output, and then the current connection state is identified by making a query whether any signal is currently being input into the slave devices B and C having the input plugs Through these processes, it is understood that an output of the slave device A is connected to an input of the slave device B and an output of the slave device B is connected to an input of the slave device C.

Accordingly, the obtained connection information of the slave device 200 is stored in the memory unit 130. Through the stored connection information, the master device 100 identifies how the slave device 200 is currently connected to the current master device 100 and other slave devices and controls the slave devices.

FIG. 19A and FIG. 19B show a mapping table in accordance with the present invention, wherein FIG. 19A indicates a mapping table when an external input comprises a DVD combo, and FIG. 19B indicates a mapping table when an external input comprises a STB. Control operations according to the state information of the slave device 200 are established in the mapping table, so that the slave device 200 can be controlled according to the established control operation when a user's key code value is input.

To prepare a mapping table, connection information of the slave devices 200 is first obtained from device identifications ID which the slave devices 200 are allocated in order to detect the slave devices 200 connected to the master device through the communication control line. That is, this is to identify how the slave device 200 is connected to the current master device 100 and other slave devices (refer to FIG. 14).

Accordingly, the mapping table comprises control commands by slave devices generated on the basis of device information or connection information of the slave device 200. Also, the control commands stored in the mapping table can be expressed as an operation item and the user can select the operation item to be controlled.

Figure 20:
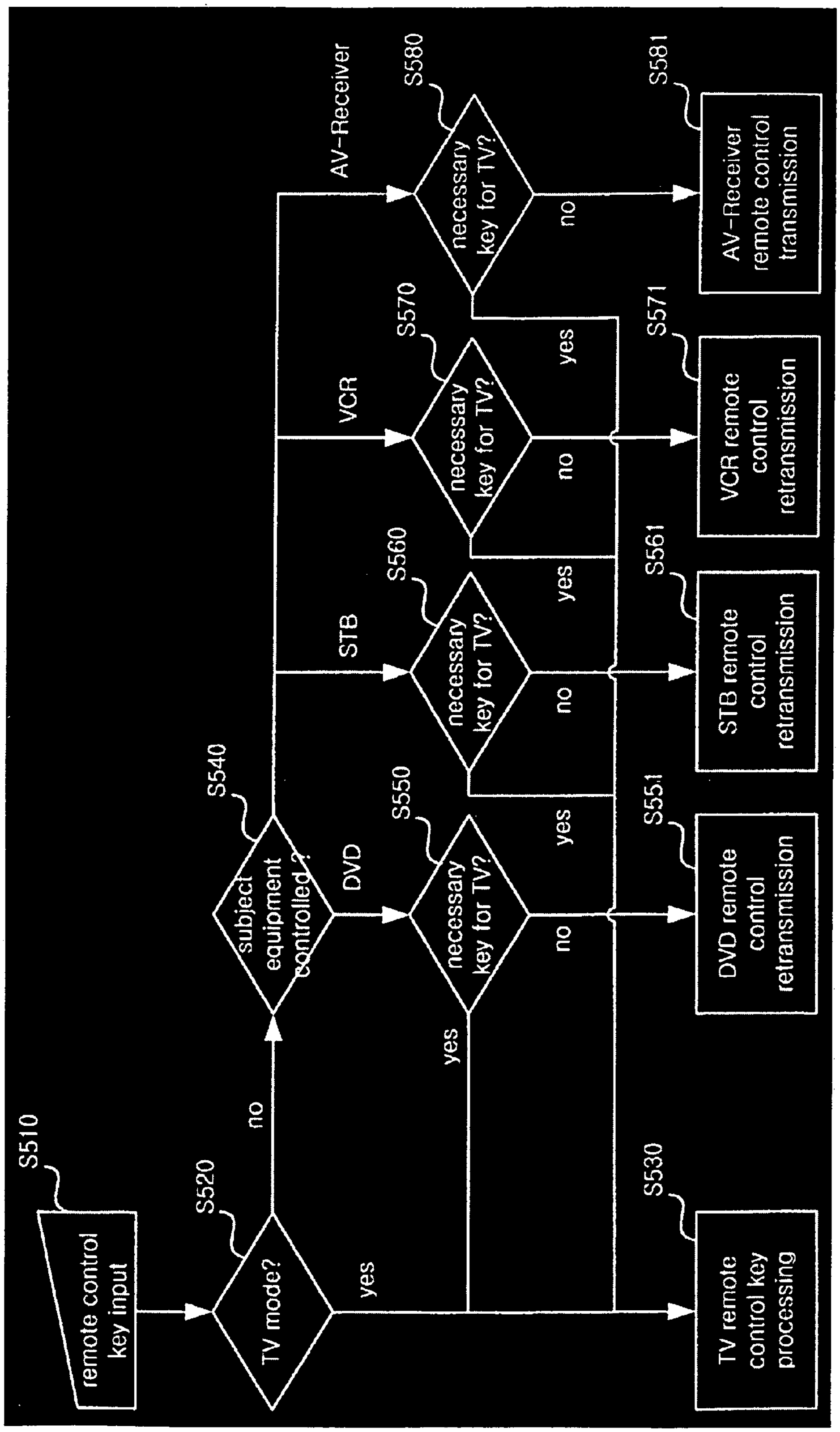
FIG. 20 is a flow chart showing how to control all devices using a remote control.

FIG. 20 is a flow chart showing how to control all the devices on a network using a remote control. Slave devices are allocated device identifications (IDs) after detecting slave devices connected through a communication control line by performing the process in FIG. 6B, and the TV set receives a predetermined key code input by a remote control through a remote control key receiving unit 110 of the TV set (S510). Next, when the TV set is currently in an execution mode, that is, in a TV broadcasting execution mode (Yes in S520), the operation of the TV set corresponding to the key code is controlled by processing the key code of the remote control (S530). If the TV is in no TV broadcasting execution mode (No in S520), it is detected which slave device transmitting a signal to the current TV set is subjected to control (S540) and the operation of the TV set or the slave device is controlled according to the mapping table of the slave device. Assuming that the slave device refers to a DVD, a VCR, a STB, or otherwise an A/V-Receiver in this exemplary embodiment, when the slave device refers to the DVD and an operation corresponding to the key code in the mapping table of FIG. 19A is performed in the TV set, a user interface of the TV set is displayed and a user input is received (S550). If the operation is performed in the DVD, the retransmission is made by the DVD remote control and the operation of the DVD corresponding to the key code is controlled (S551). The DVD operation control is performed through a request packet for the TV set to transmit the control command indicated in FIG. 13D to the DVD. In this regard, the DVD transmits a response to the control command to the TV set through the response packet indicated in FIG. 13D.

Assuming that the slave device refers to the STB (Set Top Box), when an operation corresponding to the key code in the mapping table shown in FIG. 19B is performed in the TV set, the user interface of the TV set is indicated and the user input is received (S560). If the operation is performed in the DVD, the retransmission is made by the DVD remote control and then the operation of the slave device corresponding to the key code is controlled (S561). The DVD operation control is performed through the request packet with which the TV set transmits the control command shown in FIG. 13D to the DVD, and in this regard, the DVD transmits the response to the control command to the TV set through the response packet shown in FIG. 13D.

The VCR and A/V-Receiver also follow the same process as in the DVD and STB.

Figure 21A:
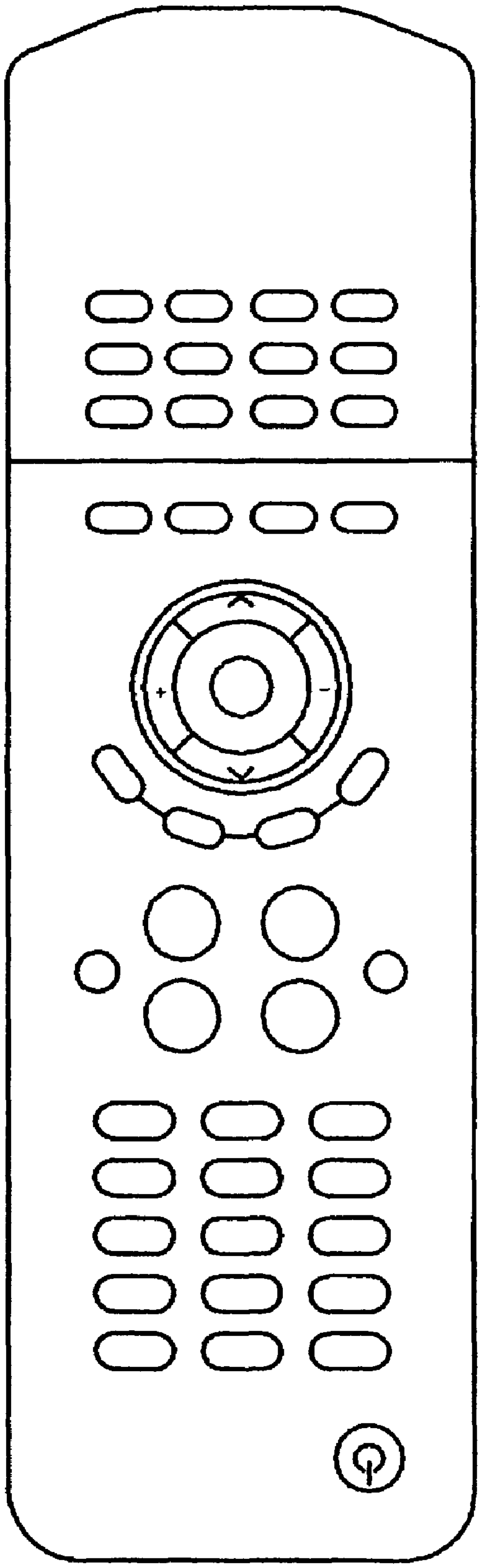
FIG. 21A to FIG. 21E show an exemplary embodiment of a remote control in accordance with the present invention.
Figure 21B:
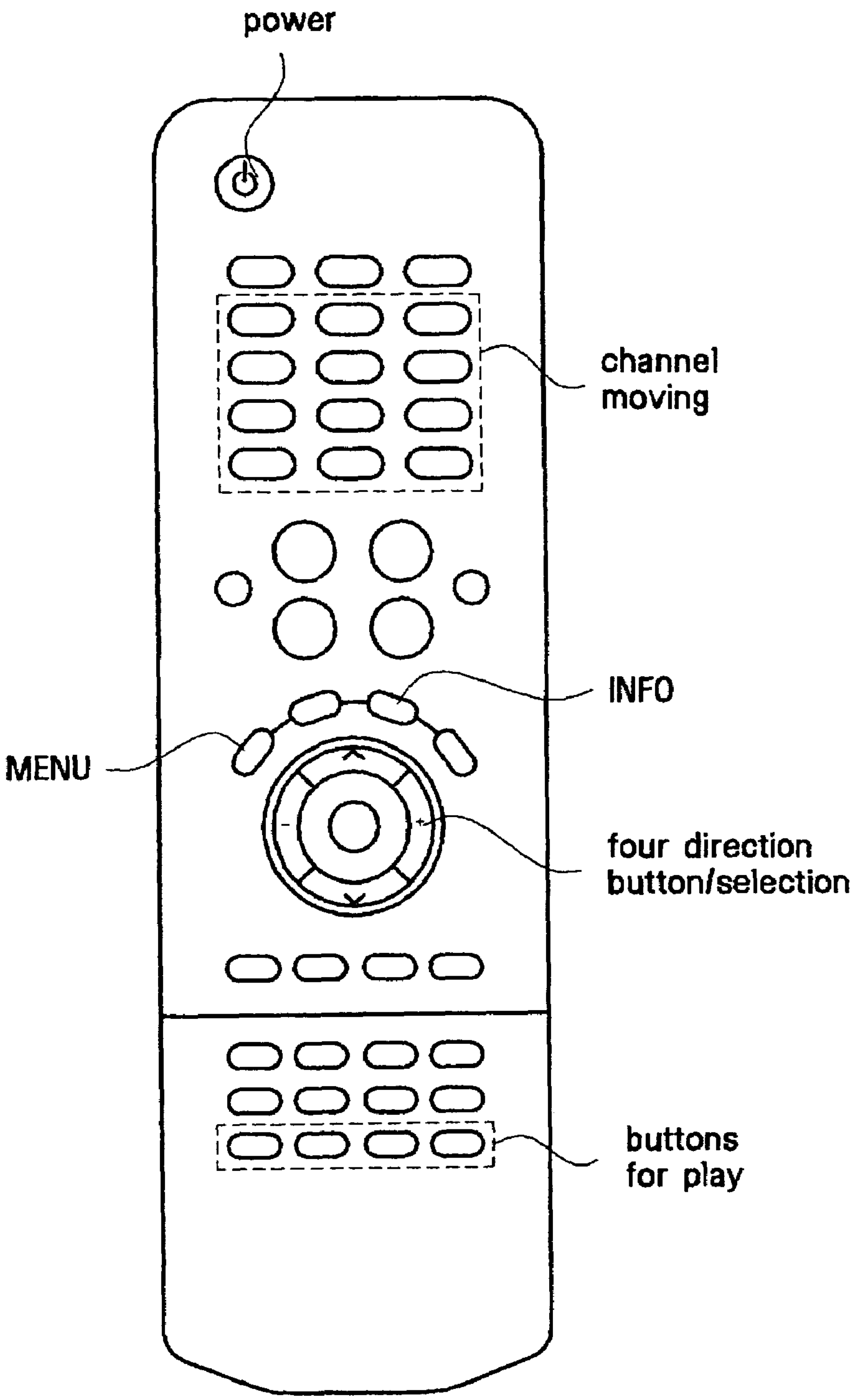
Figure 21C:
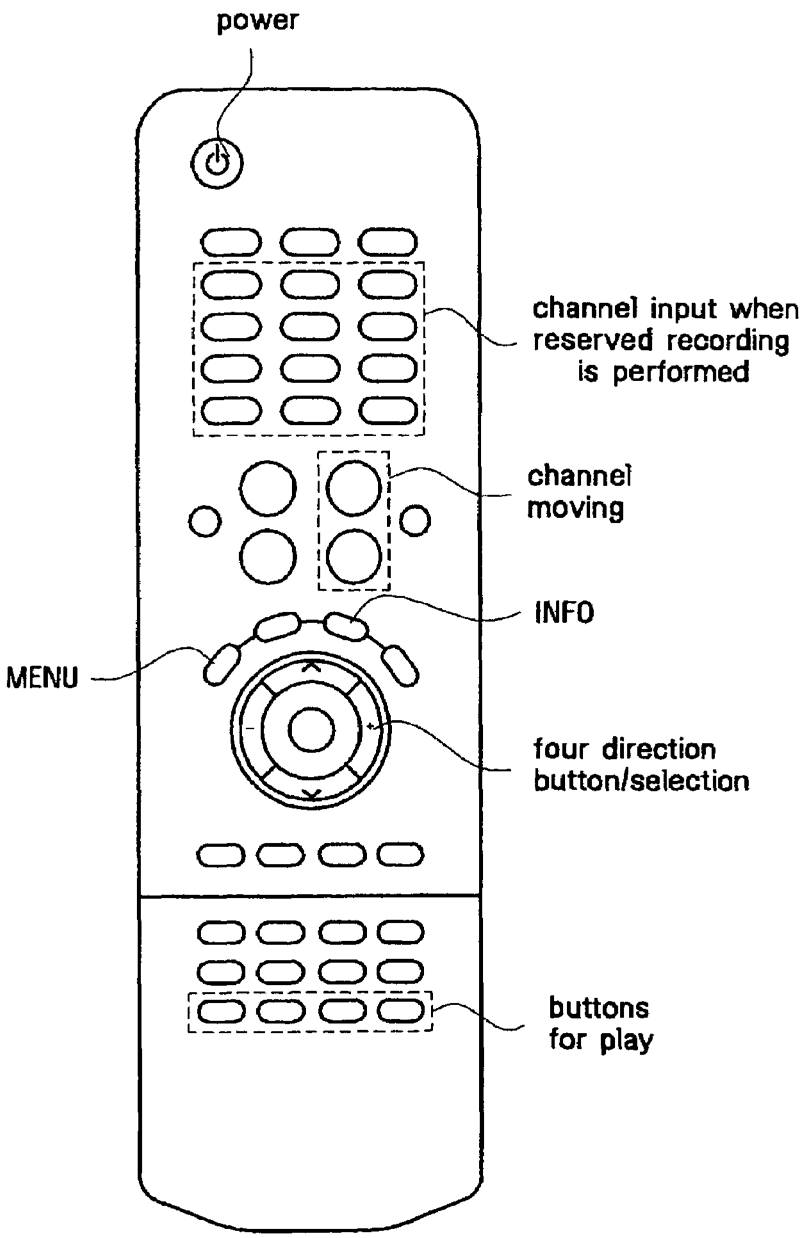
Figure 21D:
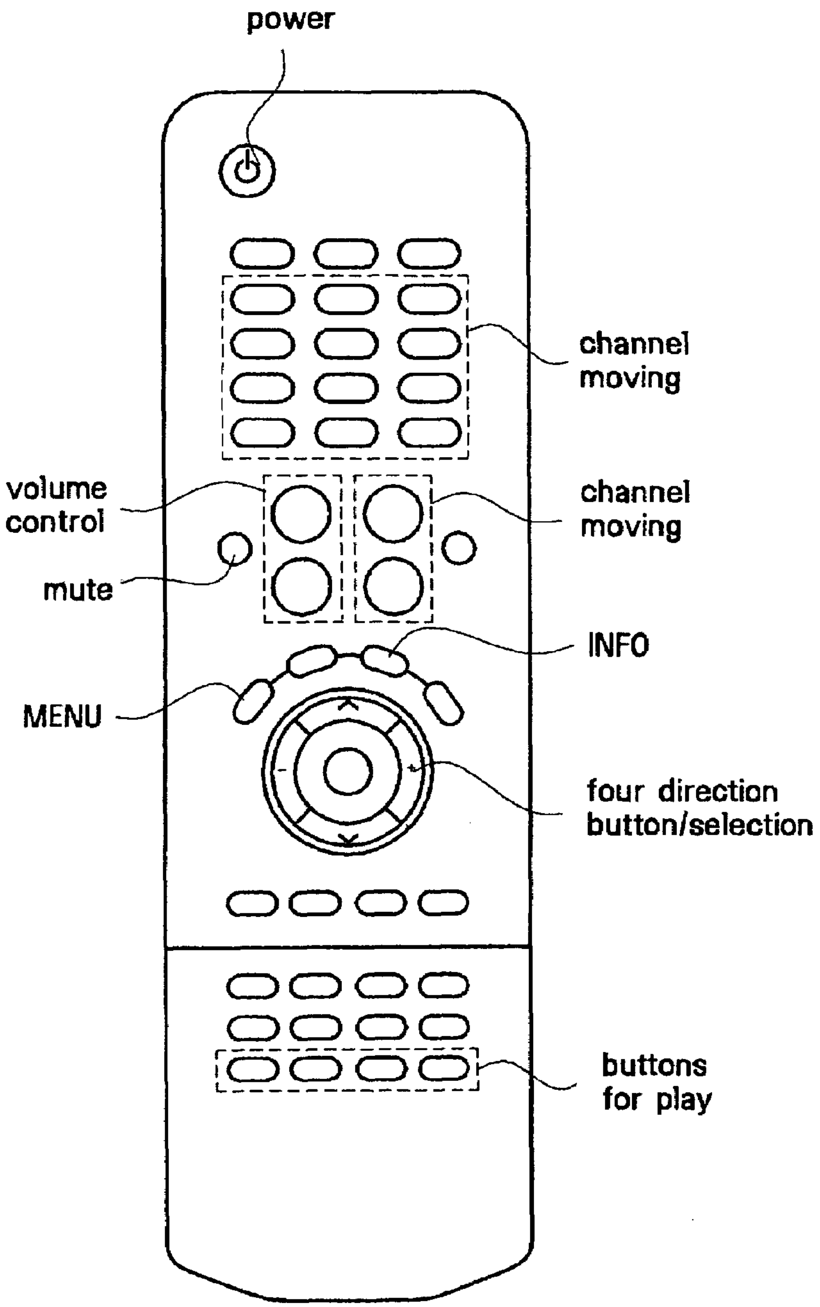
Figure 21E:
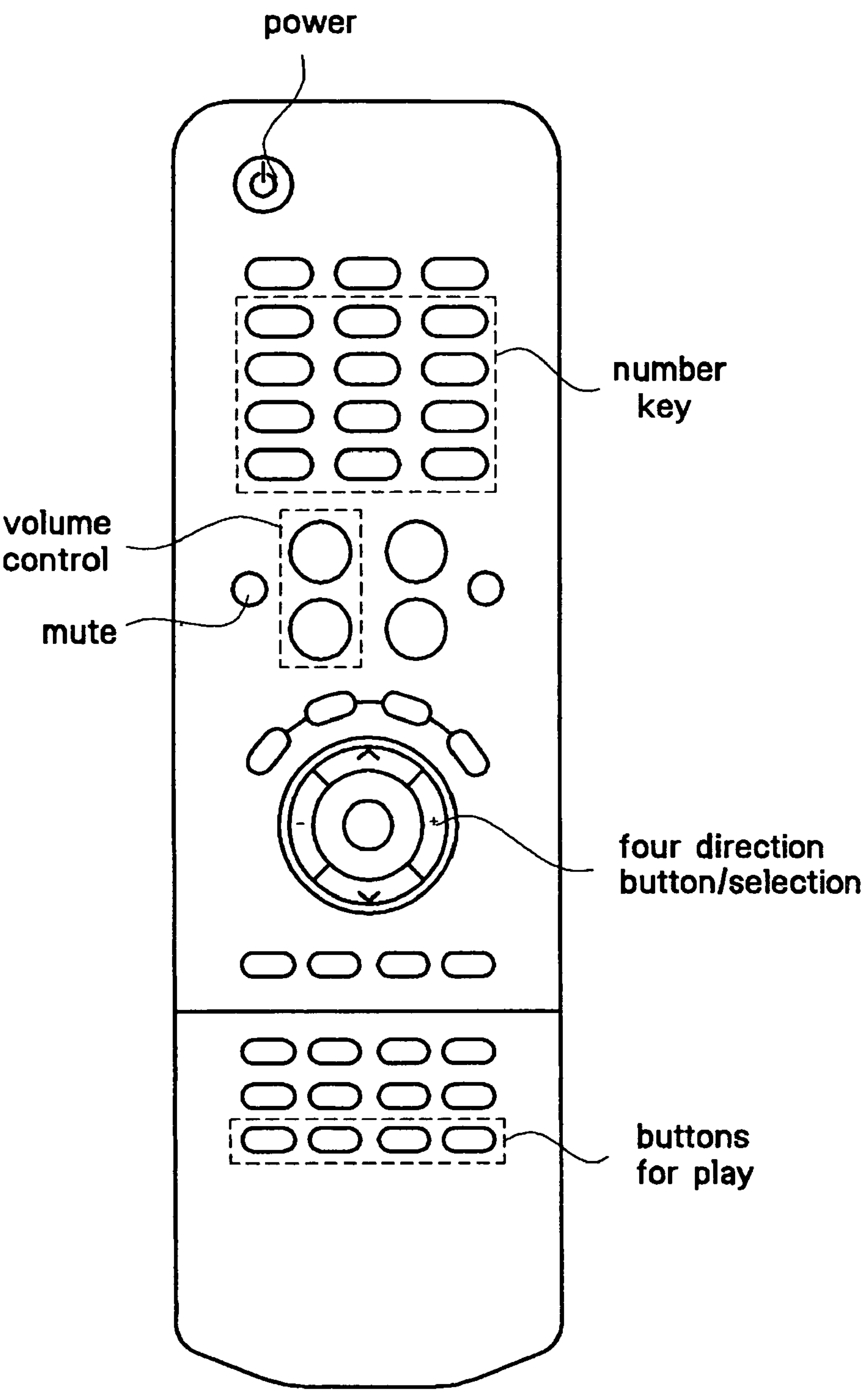

FIG. 21A to FIG. 21E show an exemplary embodiment of a remote control in accordance with the present invention, wherein FIG. 21A shows a remote control for a general master device, FIG. 21B shows a remote control for a general master device with which DVD remote control functions are mapped, FIG. 21C shows a remote control for a general master device with which VCR remote control functions are mapped, FIG. 21D shows a remote control for a general master device with which STB remote control functions are mapped, and FIG. 21E shows a remote control for a general master device with which A/V-Receiver remote control functions are mapped.

In accordance with the present invention, a remote control function for a specified slave device 200 is added to a remote control function for a general master device (that is, a TV set) so as to make it possible to control other slave devices 200 using the remote control for the master device 100 and to control each of the slave devices 200 using one remote control without changing the remote control. Here, the remote control key of the master device 100 and the remote control key of the slave devices 200 are commonly used and the master device 100 processes the remote control keys input according to states of the master device 100 and the slave devices 200, so that each of the slave devices 200 is controlled by the remote control for the master device 100.

As shown in the drawings, common keys used for the master device 100 and each of the slave devices 200 and separate keys used to control each of the master device 100 or the slave devices 200 can be established in the remote control key for the general master device. Here, the common keys are understood as remote control keys which can be used for the master device 100 and a plurality of slave devices 200, such as a volume control key and a channel selection key, and the separate keys are understood as remote control keys which are assigned for a specified device, such as a master device screen mode and a master device surround.

When the user selects the common keys, the master device 100 determines a process with respect to the common keys inputted according to states of the master device 100 and the slave devices 200. That is, in order that the user selects the common keys to allow the master device 100 to process a control of the master device 100 or the slave devices 200 according to a current state, the master device 100 has to hold information on the slave devices 200 to be controlled by the master device 100. Also, it is necessary to identify information on how each of the slave devices 200 is connected to the master device 100, for example, an input/output relationship of video signals, and an input/output relationship of audio signals on the basis of information on each of the slave devices. Finally, it is necessary to identify state information on a current operation state of each of the slave devices 200. The master device 100 performs a process for the common keys on the basis of the device information, connection information and state information of the slave devices 200.

According to the present invention described above, each of the slave devices is allocated a device ID in order to obtain device information of the slave devices, and a connection state between the master device and the slave devices is identified from the allocated ID so that the most optimal connection state can be established between the master device and the slave devices. Therefore, a user can effectively reduce efforts to find out the most optimal connection between the master device and the slave device. Also, since it is possible to control a plurality of the slave devices existing on the network with one integrated remote control, the user can conveniently control relevant devices without changing the remote control.

Although the preferred embodiments and drawings of the present invention have been disclosed for illustrative purposes, those skilled in the art appreciate that various substitutions, modifications, changes and additions are possible, without departing from the scope and spirit of the invention as disclosed in the accompanying claims.

What is claimed is:

1. A method for controlling a plurality of devices including a master device having AV terminals and slave devices connected to the master device through a communication control line, with the use of a single remote control, comprising:

(a) detecting the slave devices, and allocating a device ID to each of the respective detected slave devices;

(b) identifying to which slave device of the detected slave devices each AV terminal is connected, by controlling the detected slave devices to be powered on or off through the communication control line with the use of the device IDs;

(c) receiving a predetermined key code from a user's remote control; and (d) determining which device among the master device and the detected slave devices to control and determining an operation of the determined device, by referring to an item of a mapping table corresponding to the key code, and controlling an operation of the determined device through the communication control line with the use of the device ID of the determined device.

2. The method as claimed in claim 1, wherein step (a) comprises:

disconnecting a connection between a slave device to be identified and a sub slave device of the slave device;

requesting from the slave device to be identified a device identification information of the slave device to be identified;

receiving a response to the request from the slave device to be identified; and allocating the device ID to the slave device to be identified.

3. The method as claimed in claim 1, wherein step (b) comprises:

turning on a power supply to a slave device of the detected slave devices, whose connection status the master device desires to know, and searching for an AV terminal to which a signal from the master device is inputted;

turning off power supply to the slave device;

determining whether a signal is inputted from the searched AV terminal of the slave device; and determining that an AV cable of the slave device is connected to the searched AV terminal, when it is determined that no signal has been inputted.

4. A master device for identifying a slave device connected thereto through a communication control line, comprising:

a control signal transceiver transmitting a packet including various control commands to the slave device and receiving response packets to the control commands;

a control signal generating unit generating the control command in the form of a digital signal in compliance with a predetermined protocol; and a device ID generating unit allocating a device ID to the slave device, wherein, when the communication control line is in a series communication mode, the control signal generating unit generates a control signal to disconnect terminals connected between slave devices and a control signal to connect the connected terminals.

5. A slave device connected to a master device through a communication control line, which is identified by the master device, comprising:

a control signal transceiver receiving a packet including various control commands from the master device and transmitting response packets to the control commands;

a communication control line through which the master device and the slave device are connected and through which the packets move;

a memory storing therein the device ID received from the master device;

a buffer which connects communication between the slave device and another slave device; and a buffer control unit disconnecting or connecting the buffer according to the control signal received from the master device, when the communication control line is in a series communication mode.

6. A television set (TV) comprising:

a key input unit receiving a key input by a user;

an ID generating unit allocating a device ID to a slave device detected to be connected to a master device through a communication control line by disconnecting and connecting the slave device to another slave device;

a control signal transceiver transmitting a digital signal containing control commands to the slave device with the use of the device ID allocated according to the key input by the user and receiving a digital signal containing responses to the control commands;

a control signal generating unit generating a digital signal containing the control commands according to a predetermined protocol; and an AV signal transceiver transmitting to the slave device an analog signal for a video or a sound and receiving the signal through an AV cable according to the control commands.

7. The TV according to claim 6 wherein the an ID generating unit disconnects and connects the slave device to the another slave device when the communication line is in a series communication mode.

* * * * *